(12) United States Patent
Goldwitz

(10) Patent No.: US 12,179,703 B2
(45) Date of Patent: Dec. 31, 2024

(54) FREE STANDING SUV FOLDING TRUNK

(71) Applicant: Brian Goldwitz, Waterbury, CT (US)

(72) Inventor: Brian Goldwitz, Waterbury, CT (US)

( * ) Notice: Subject to any disclaimer, the term of this patent is extended or adjusted under 35 U.S.C. 154(b) by 0 days.

(21) Appl. No.: 18/380,205

(22) Filed: Oct. 16, 2023

(65) Prior Publication Data

US 2024/0326699 A1 Oct. 3, 2024

Related U.S. Application Data

(60) Provisional application No. 63/456,115, filed on Mar. 31, 2023.

(51) Int. Cl.
  B60R 7/02 (2006.01)
  B60R 5/04 (2006.01)
  B60R 7/14 (2006.01)
  B60R 9/06 (2006.01)

(52) U.S. Cl.
  CPC ............. B60R 7/02 (2013.01); B60R 7/14 (2013.01); B60R 5/045 (2013.01); B60R 9/065 (2013.01)

(58) Field of Classification Search
  CPC ... B60R 7/02; B60R 9/065; B60R 2011/0082; B60R 5/045
  USPC .......................................................... 224/542
  See application file for complete search history.

(56) References Cited

U.S. PATENT DOCUMENTS

| | | | | |
|---|---|---|---|---|
| 4,889,377 A * | 12/1989 | Hughes | ............... | B60P 3/14 296/3 |
| 4,898,284 A * | 2/1990 | Arens | ............... | B25H 3/04 296/3 |
| 5,015,025 A * | 5/1991 | Henriquez | ............... | B60R 11/06 224/539 |
| 5,169,200 A * | 12/1992 | Pugh | ............... | B60R 9/00 224/543 |
| 6,065,794 A * | 5/2000 | Schlachter | ............... | B60R 5/04 296/37.16 |
| 6,170,724 B1 * | 1/2001 | Carter | ............... | B60R 9/00 224/543 |
| 6,401,995 B1 * | 6/2002 | Yuille | ............... | B60R 9/00 224/404 |
| 6,536,826 B1 * | 3/2003 | Reed | ............... | B60P 3/42 224/404 |
| 7,234,618 B2 * | 6/2007 | Warganich | ............... | B60R 7/02 224/403 |
| 7,731,026 B2 * | 6/2010 | Harrison | ............... | B60P 3/14 206/349 |
| 8,256,819 B1 * | 9/2012 | Gregory | ............... | B60R 9/065 296/37.6 |
| 8,701,950 B2 * | 4/2014 | Roach | ............... | B60P 7/0892 224/404 |

(Continued)

*Primary Examiner* — Justin M Larson

(74) *Attorney, Agent, or Firm* — Furr Law Firm; Jeffrey M. Furr

(57) ABSTRACT

The current invention is a free-standing clip-in trunk that can be placed in a vehicle such as a jeep or SUV. The trunk can be efficiently folded and stored. It can be placed in the back of the SUV. It will be comprised of two sides, a Base Plate, two top panels, a back panel, three hinges and a securing means. The two sides will be attached to the vehicle as will the Base Plate. The two sides and the Base Plate will attach to the bed of the SUV. The length of the Base Plate and the size of the sides will depend on the size of the bed of the vehicle. The trunk has three panels consisting of two top panels and one back panel connected by hinges.

11 Claims, 32 Drawing Sheets

(56) References Cited

U.S. PATENT DOCUMENTS

| | | | | |
|---|---|---|---|---|
| 10,259,394 | B2* | 4/2019 | Goldwitz | B60R 5/045 |
| 10,315,580 | B2* | 6/2019 | Goldwitz | B60R 5/045 |
| 10,800,337 | B2* | 10/2020 | Goldwitz | B60R 5/045 |
| 10,889,247 | B2* | 1/2021 | Goldwitz | B60R 9/06 |
| 11,279,421 | B1* | 3/2022 | Hoogendoorn | B60R 9/06 |
| 11,358,534 | B2* | 6/2022 | Gardner | B60R 9/065 |
| 11,479,180 | B2* | 10/2022 | Jayakumar | B60R 9/02 |
| 11,498,490 | B1* | 11/2022 | Dexter | B60R 11/00 |
| 11,597,325 | B2* | 3/2023 | Huggett | B60R 7/02 |
| 2012/0000954 | A1* | 1/2012 | Shea | B65D 81/3823 |
| | | | | 220/6 |
| 2016/0159288 | A1* | 6/2016 | Ito | B60R 7/02 |
| | | | | 224/542 |
| 2018/0134223 | A1* | 5/2018 | Goldwitz | B60R 5/045 |
| 2018/0147995 | A1* | 5/2018 | Goldwitz | B60R 9/065 |
| 2022/0161729 | A1* | 5/2022 | Huggett | B60R 5/04 |

\* cited by examiner

FREE STANDING SUV FOLDING TRUNK

RELATED APPLICATIONS

This Application is a non-provisional application of Provisional Application 63/456,115 filed on Mar. 31, 2023 and claims the priority date.

TECHNICAL FIELD

The technology discussed below relates a folding trunk assembly and more particularly one that flows flat and works with SUV and jeeps.

BACKGROUND

People need with SUV and jeeps sometimes need a trunk to store and transport goods while driving their SUV ("Sports Utility Vehicle") such as a Bronco®. The current art does not allow a foldable easy to install installable trunks.

There exists a great need for a trunk for SUVs that is foldable when there is no longer need for a trunk. This will allow the user to fold the trunk when a larger space in the bed is needed.

There currently no installable folding trunks for SUVs that work well and fold down easily and efficiently.

There is still room for improvement in the art.

SUMMARY

The current invention is a free-standing clip-in folding trunk for SUV and similar vehicles that can be efficiently folded and stored. It can be placed in the back of the SUV. It will be comprised of two sides, a Base Plate, two top panels, a back panel three hinges and a securing means. The two sides will be attached to vehicle as will the Base Plate. The two sides and the Base Plate will attach to the bed of the SUV. The length of the Base Plate and the size of the sides will depend on the size of the bed of the vehicle. The trunk has a plurality of panels connected by hinges. The trunk can have molle boards or holding tables or shelves.

These are improvements over the current art.

DRAWINGS

Figure 1:
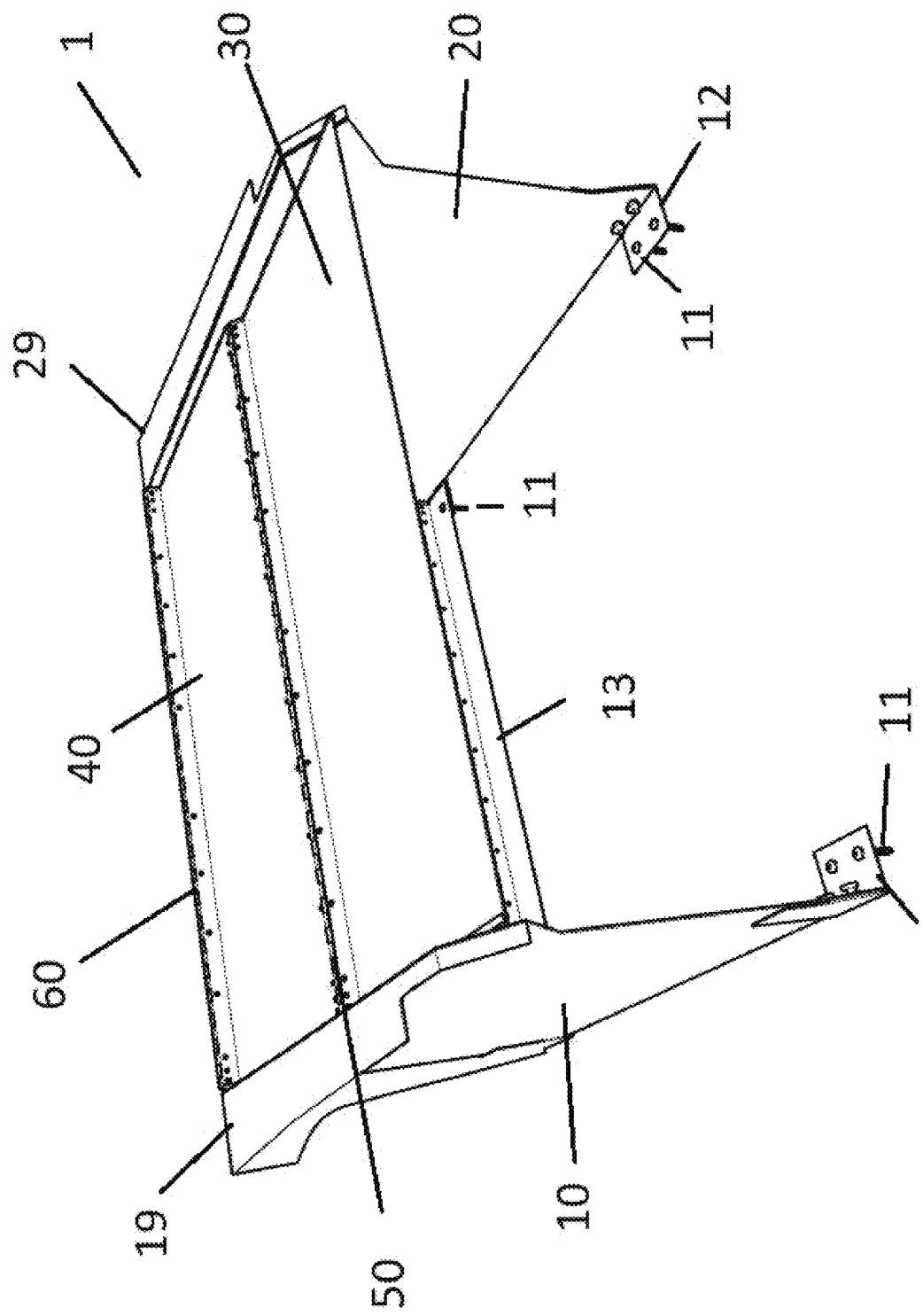
Figure 2:
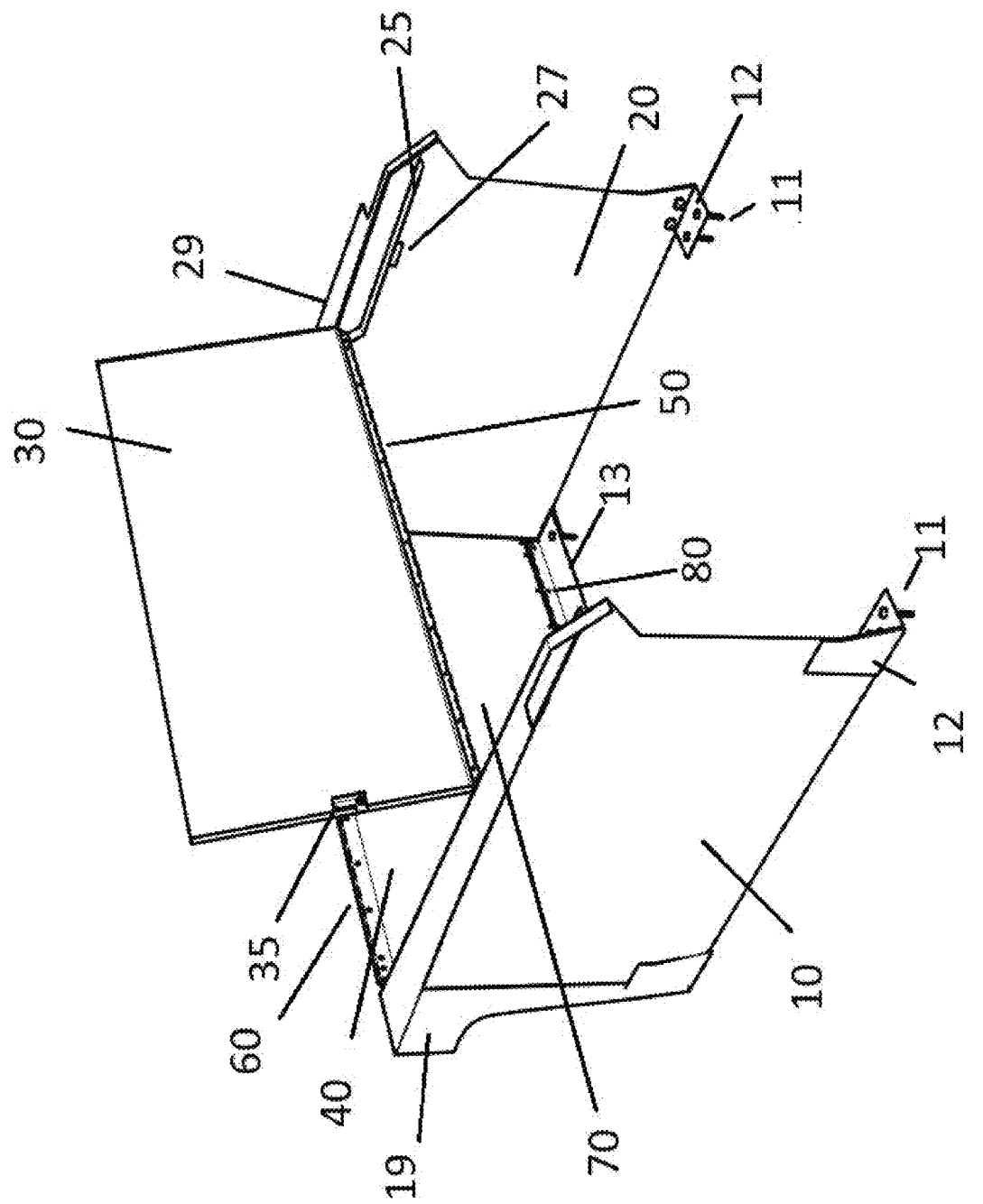
Figure 3:
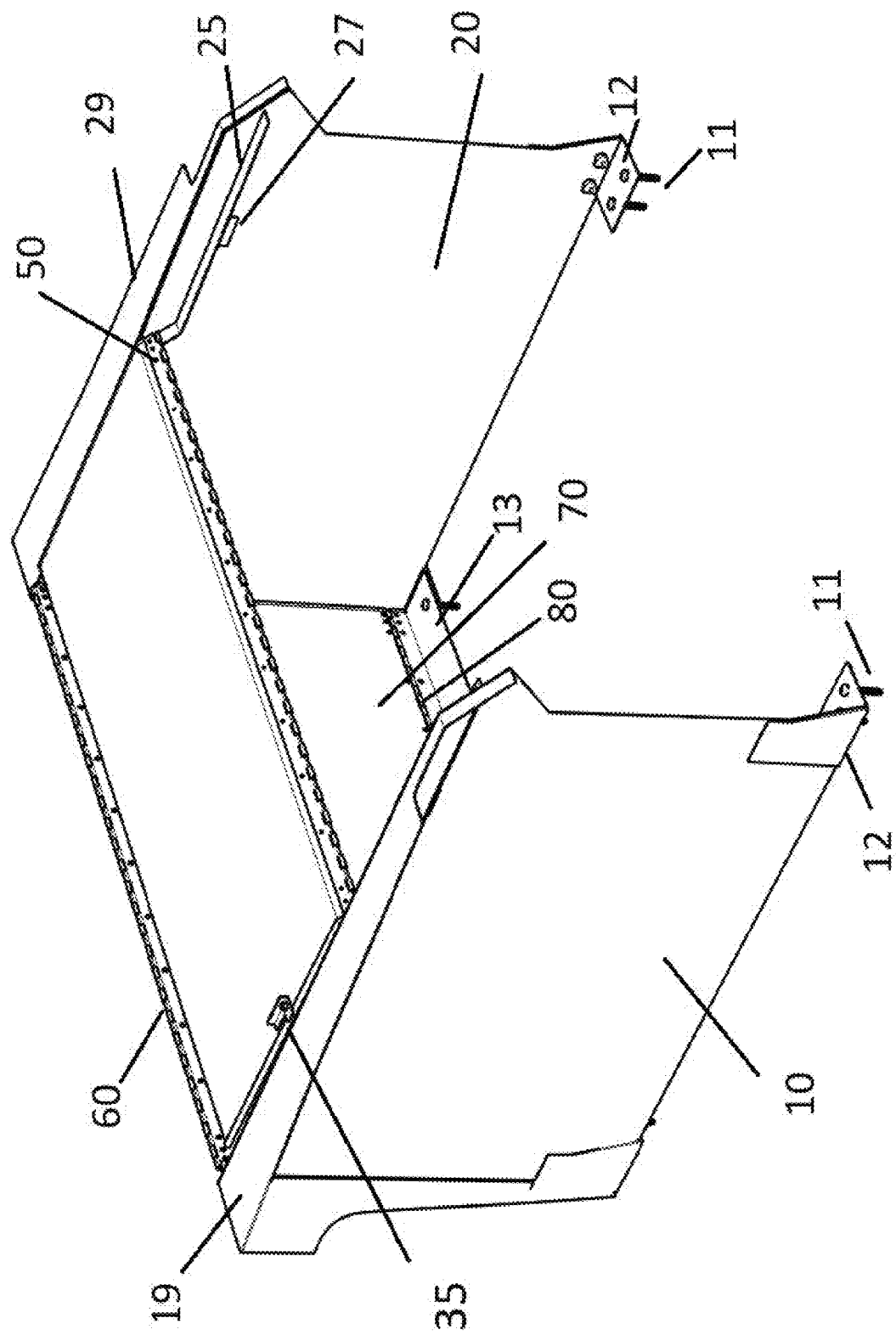
Figure 4:
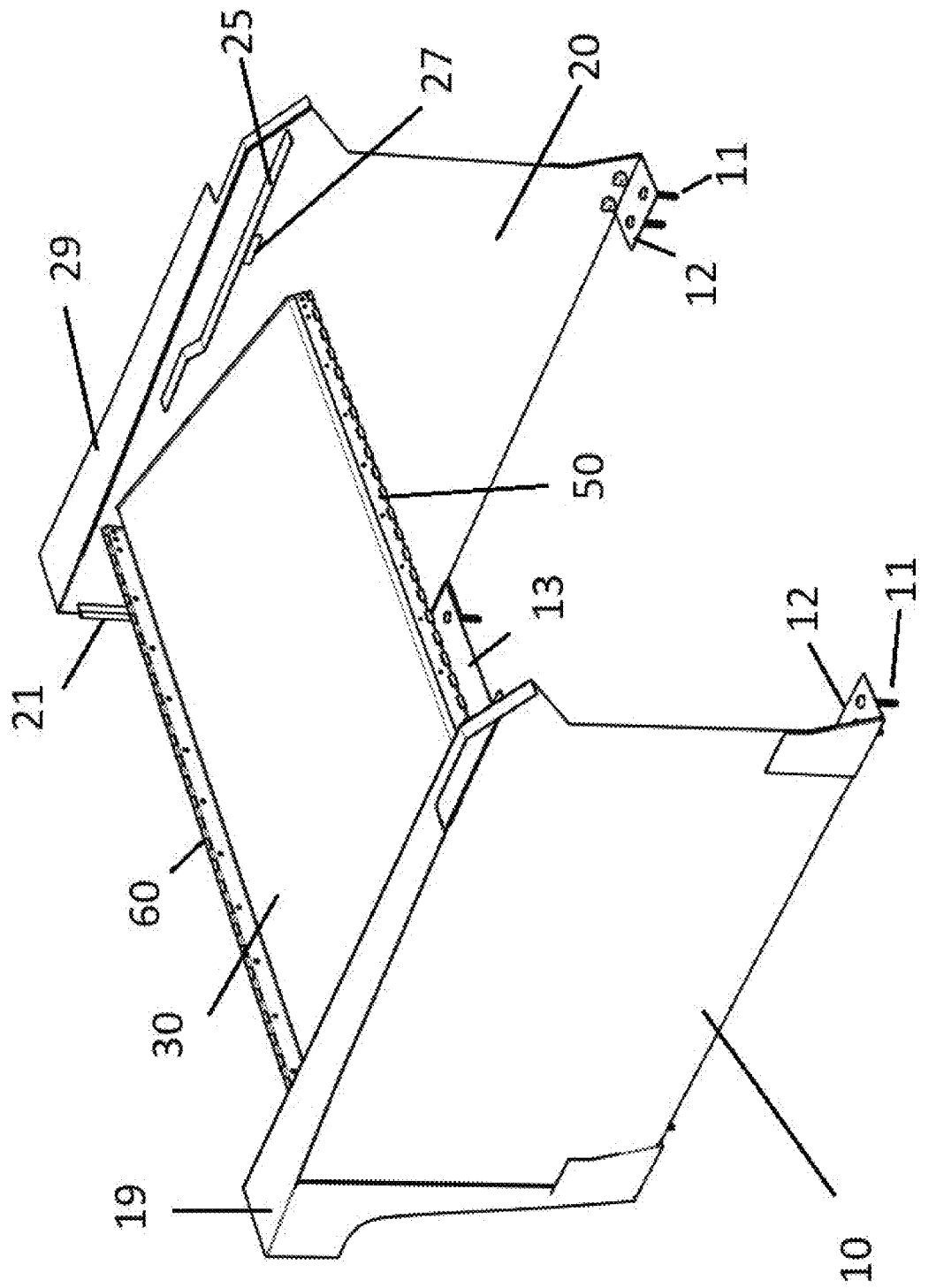
Figure 5:
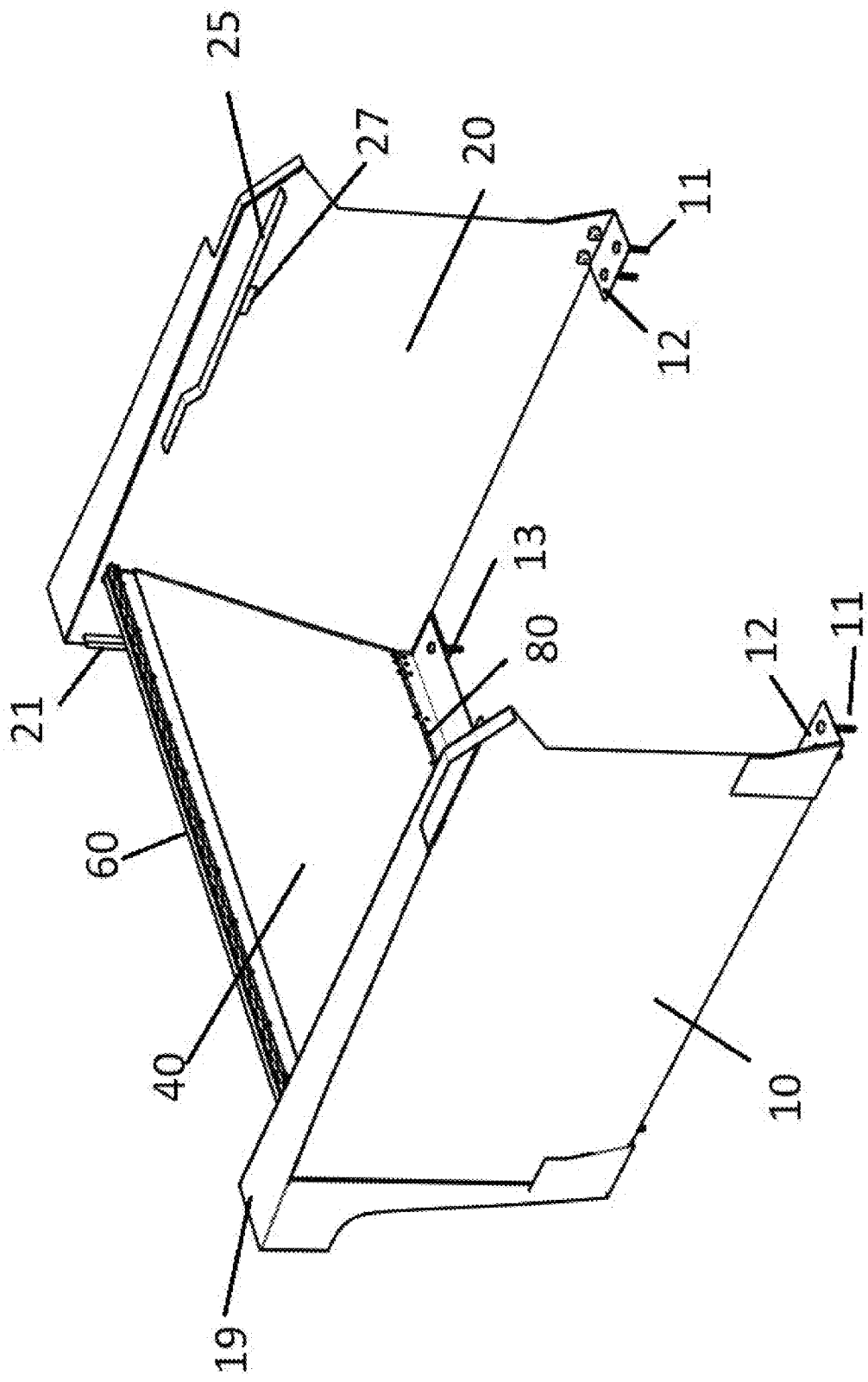
Figure 6:
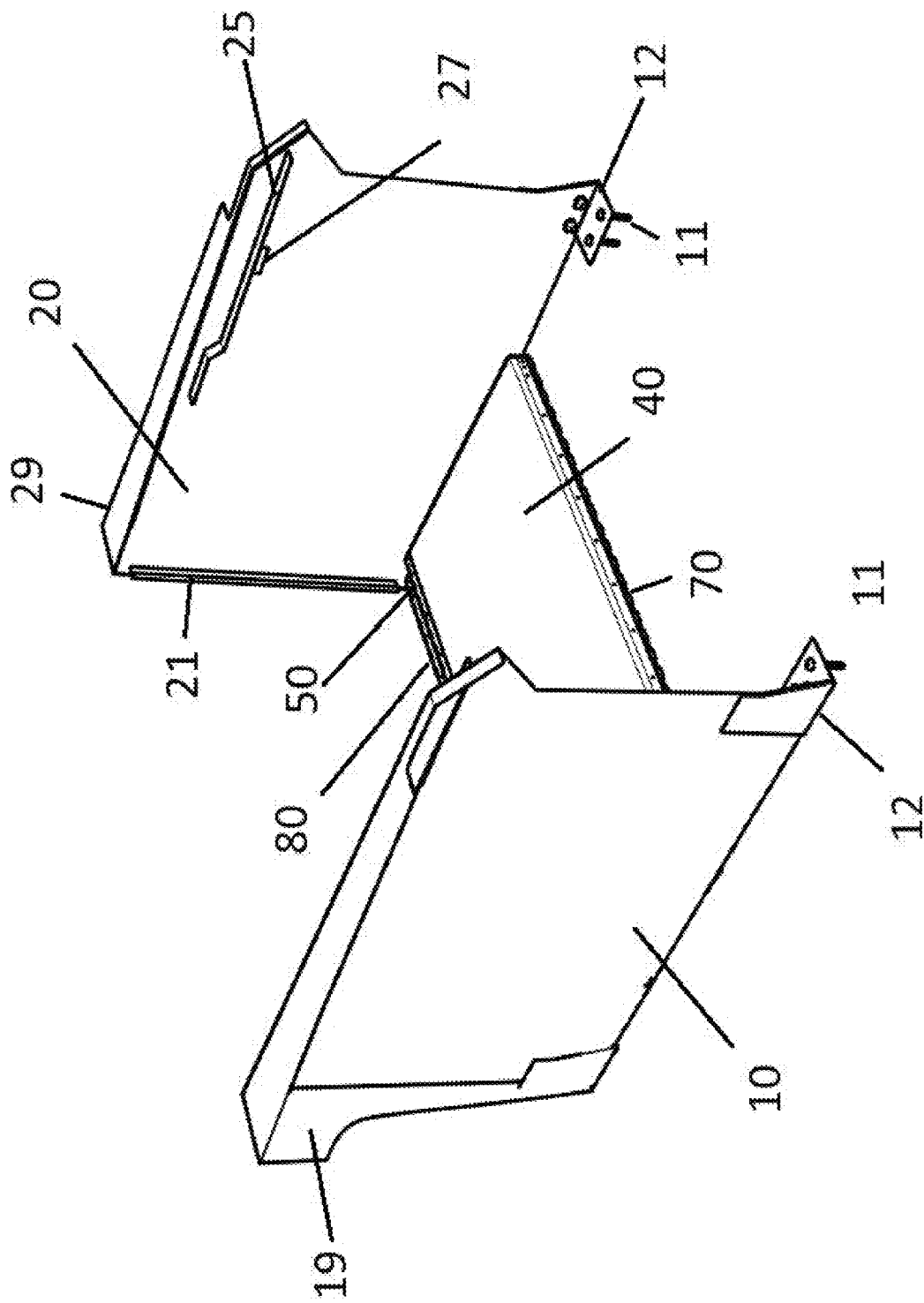
Figure 7:
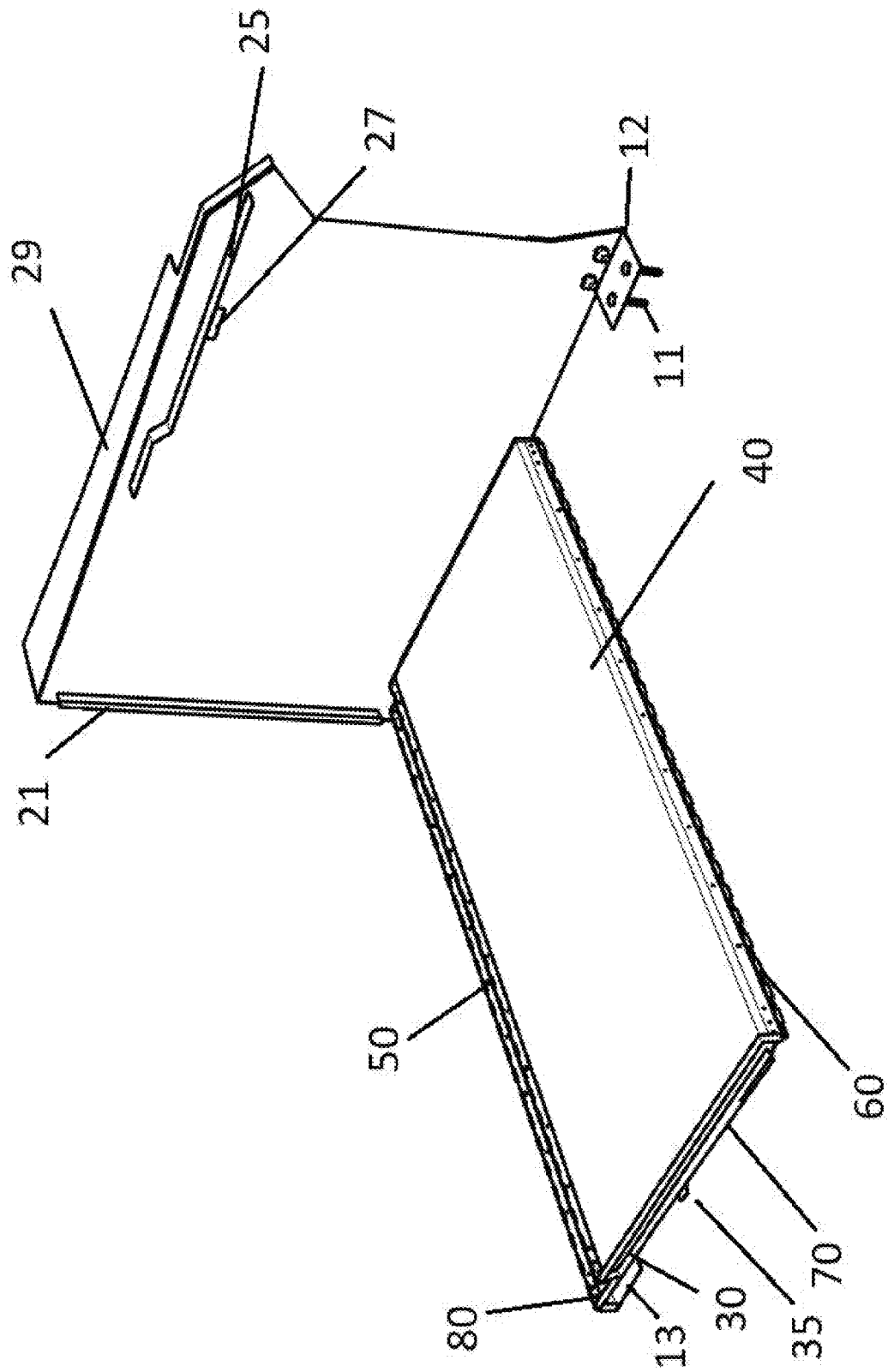
Figure 8:
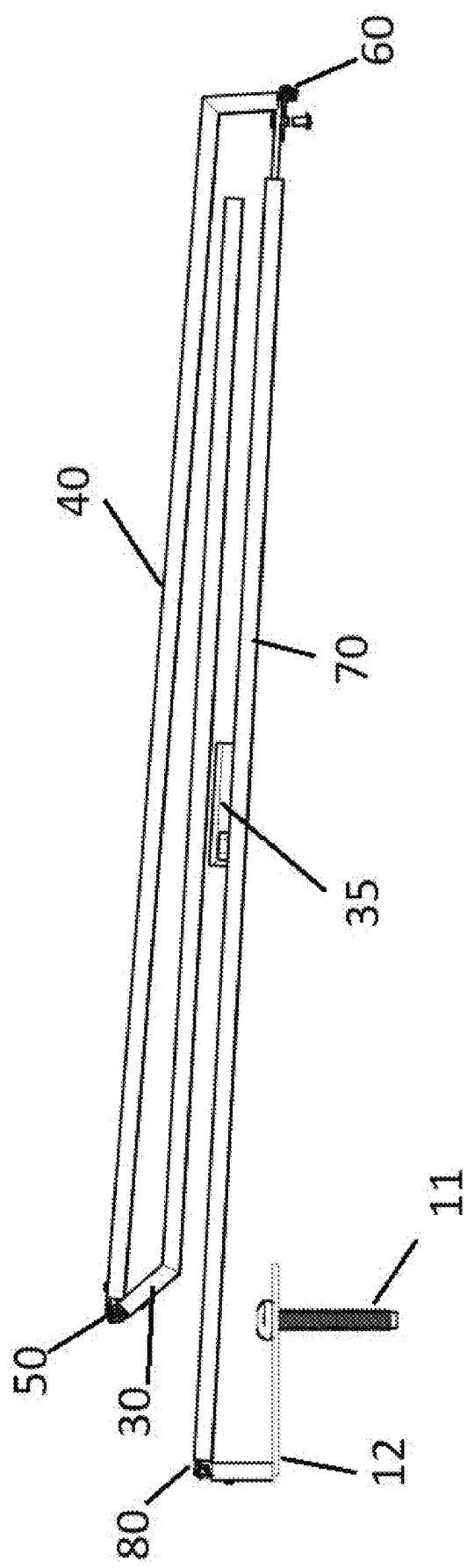
Figure 9:
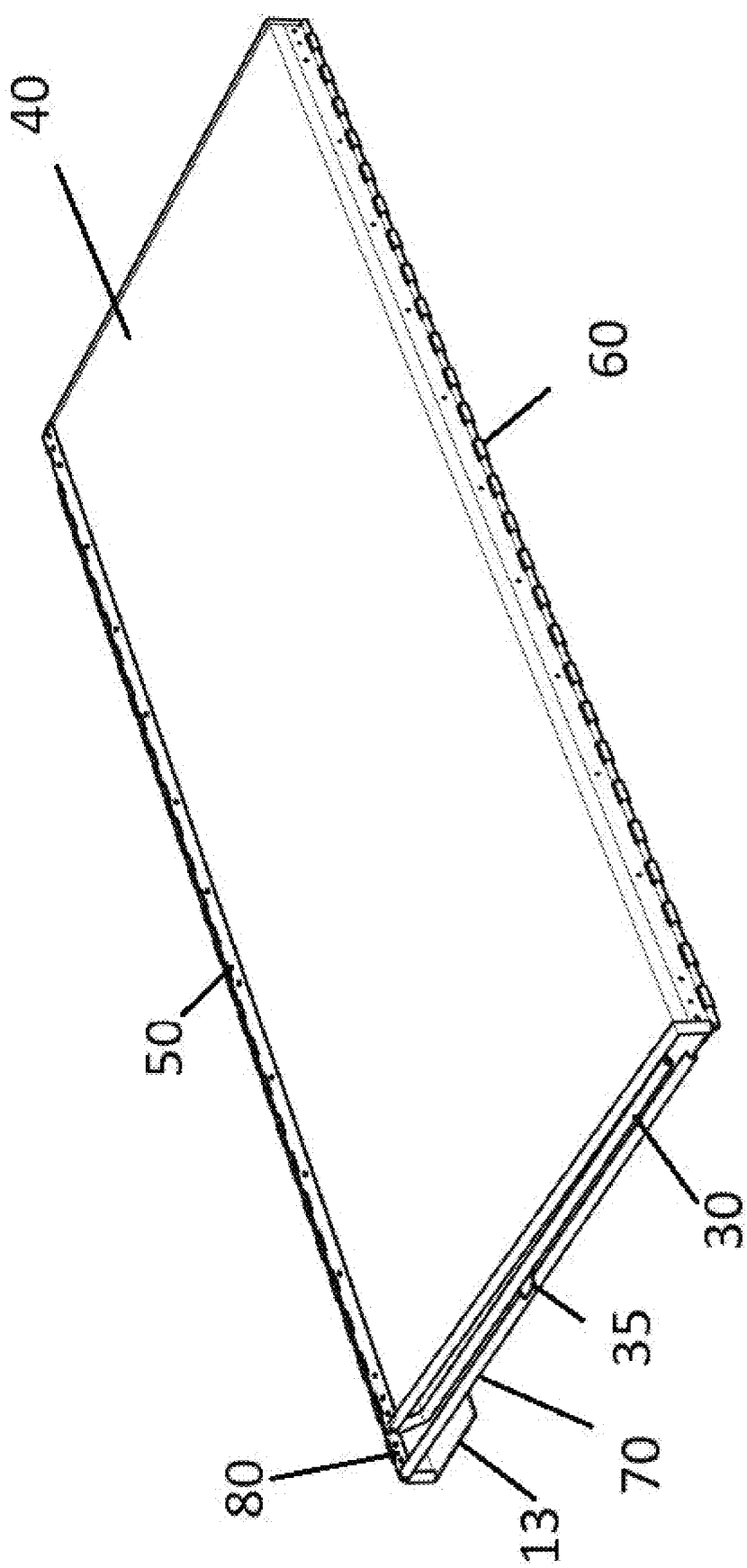
Figure 10:
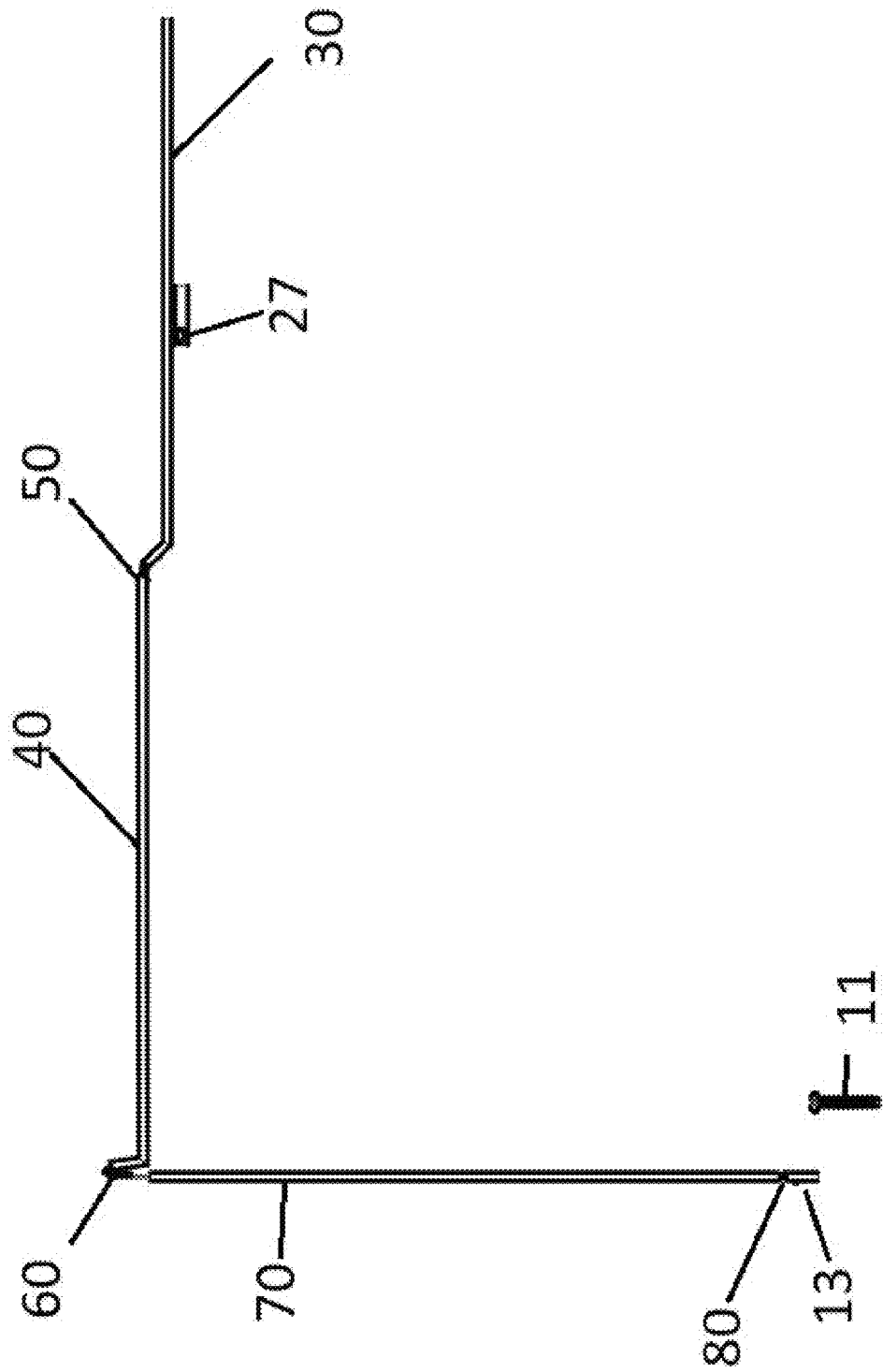
Figure 11:
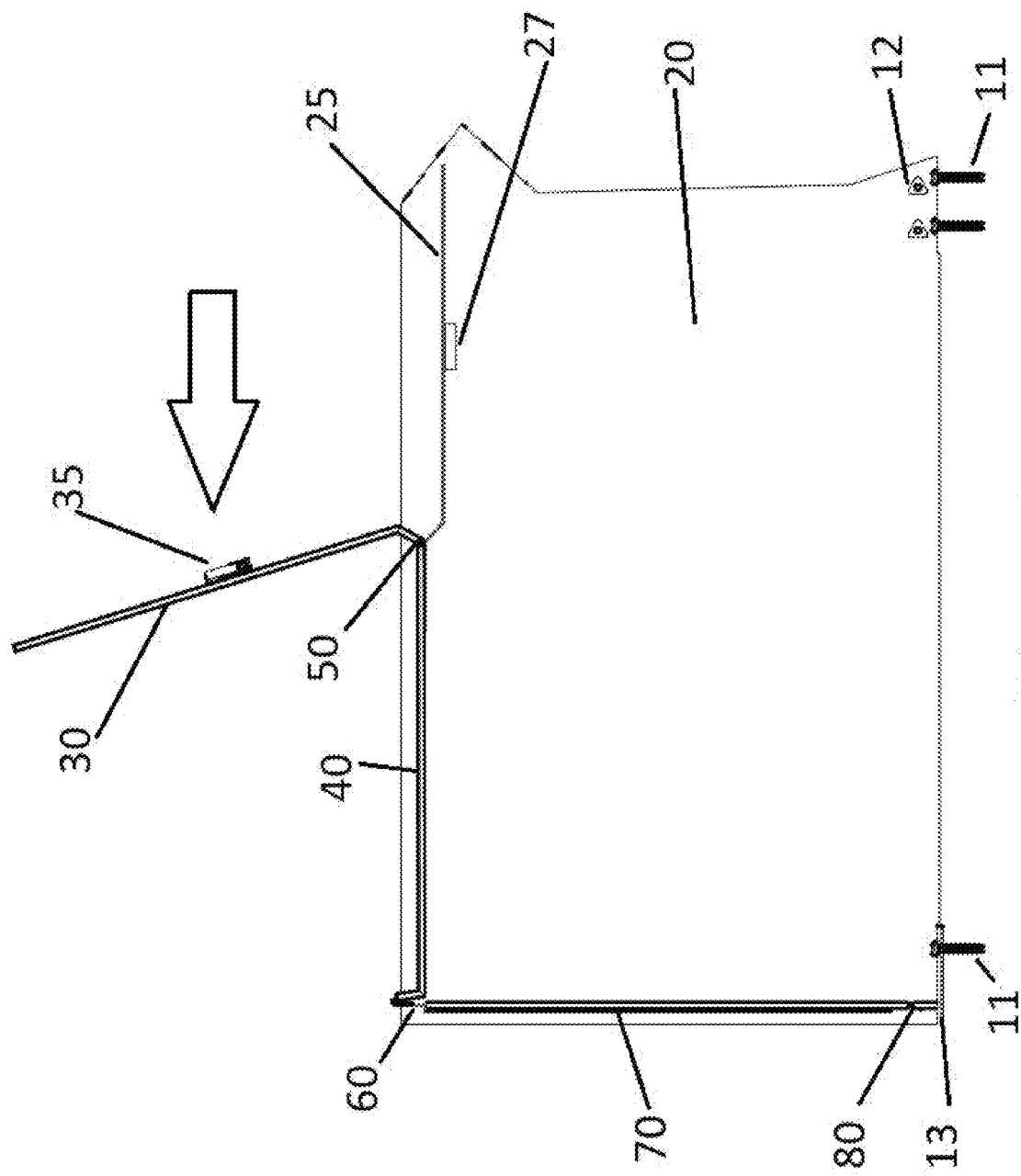
Figure 12:
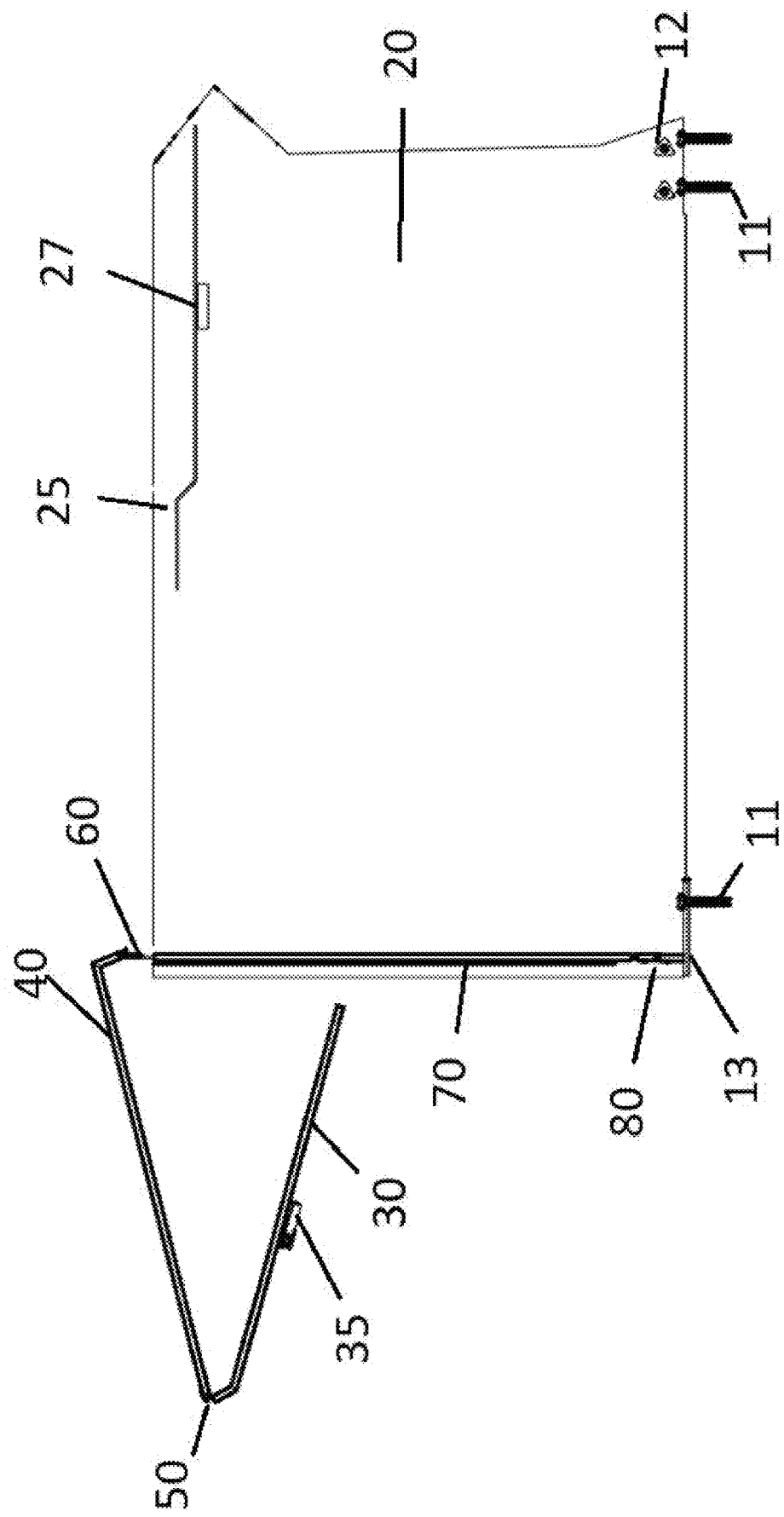
Figure 13:
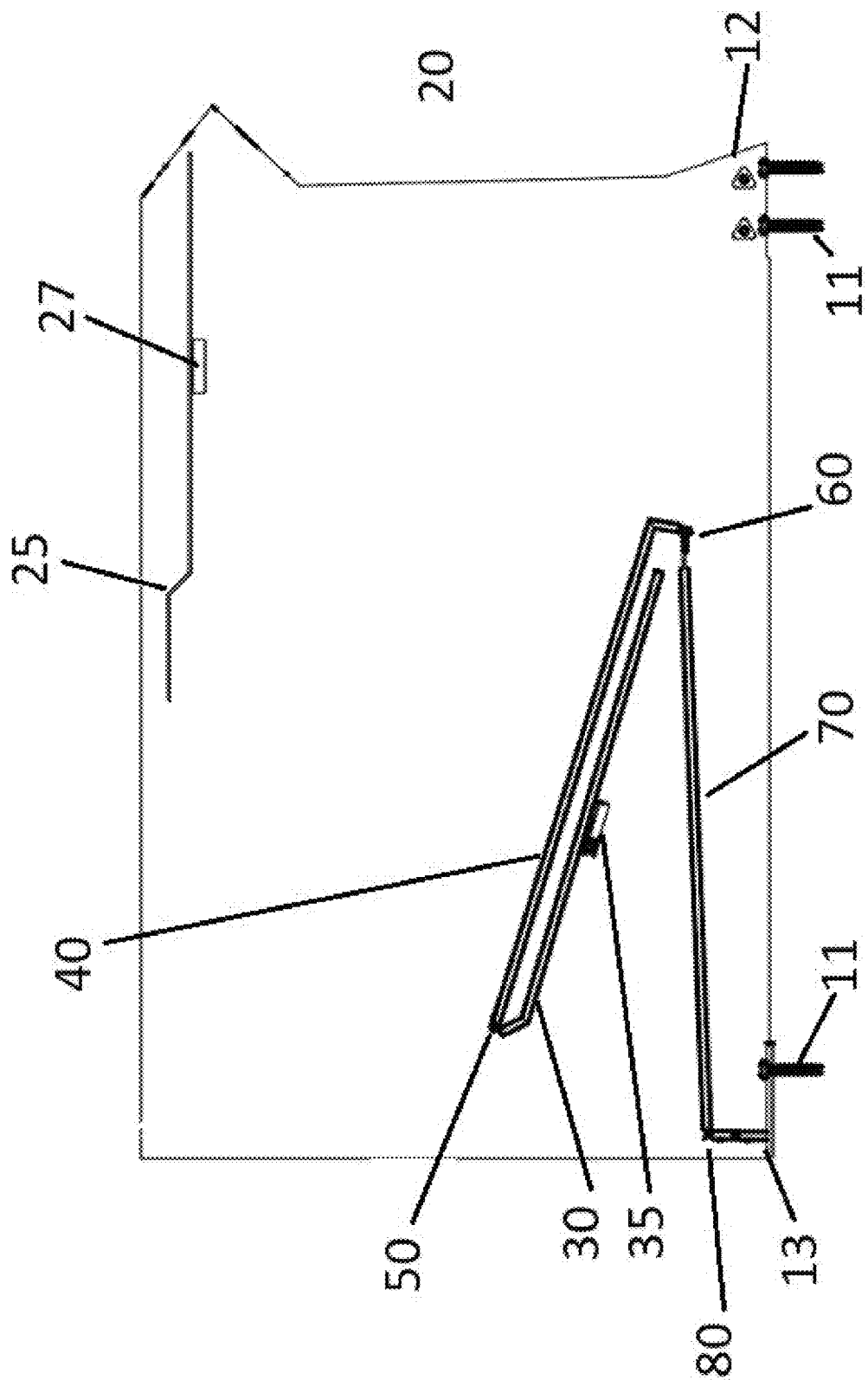
Figure 14:
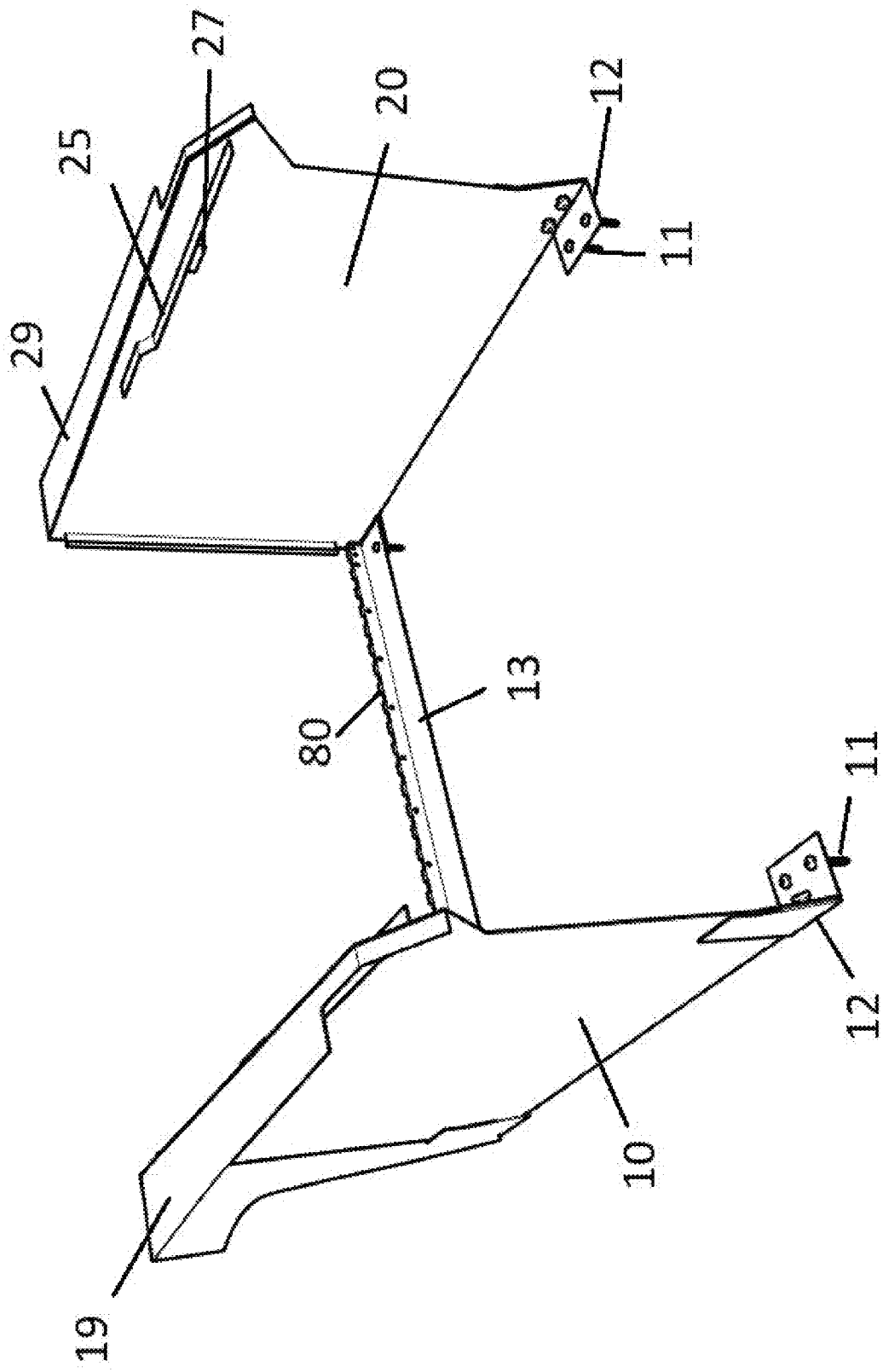
Figure 15:
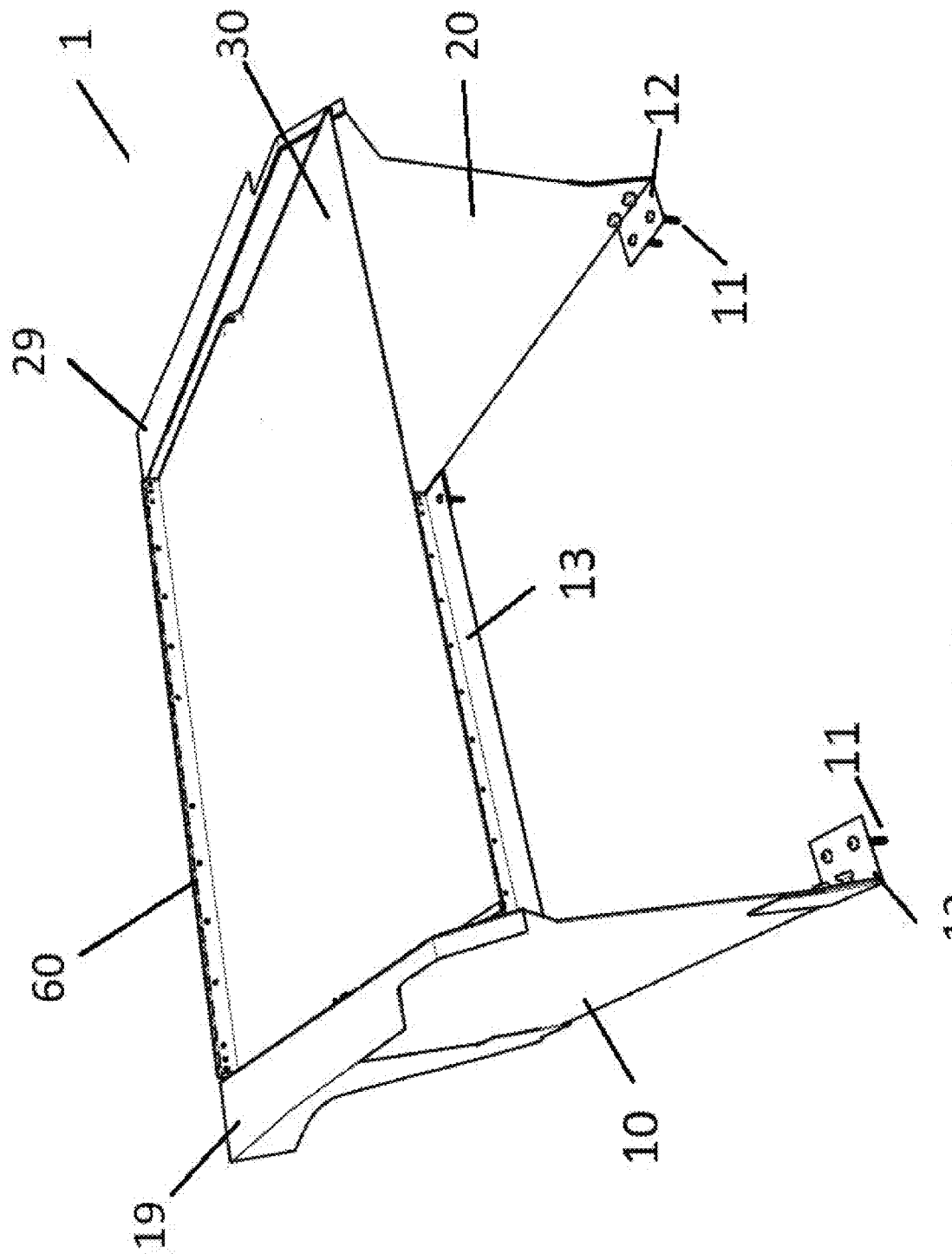
Figure 16:
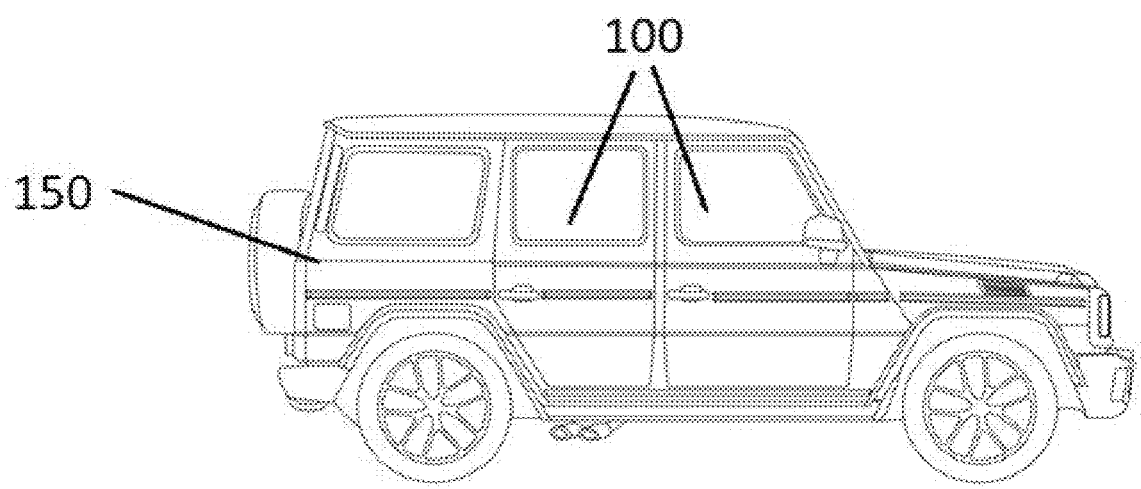
Figure 17:
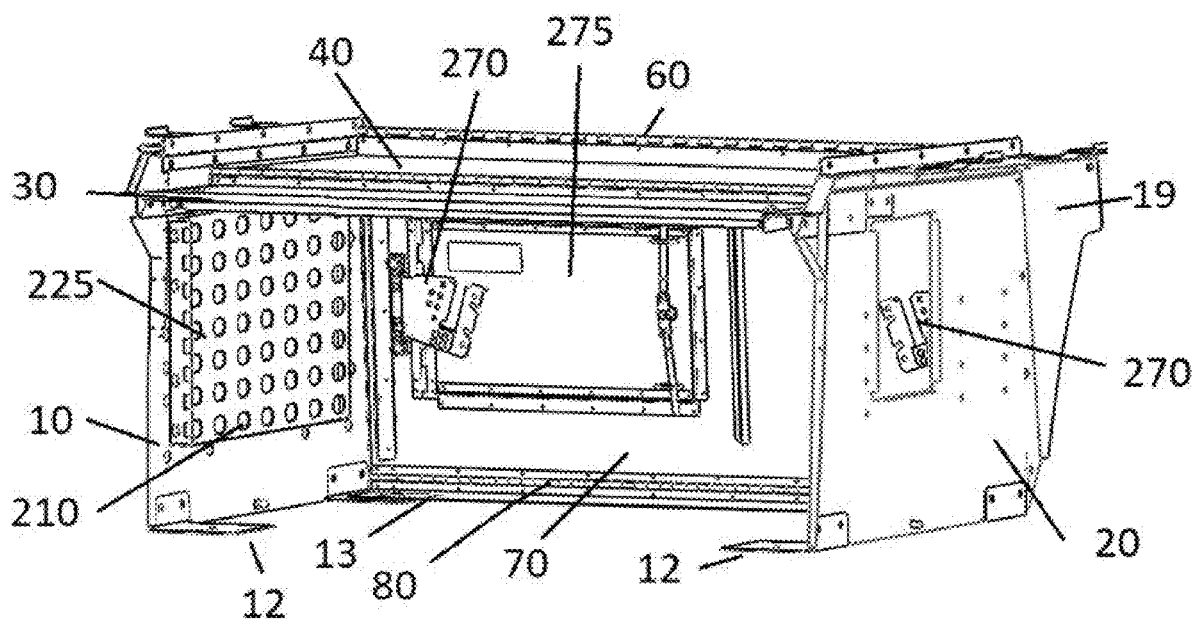
Figure 18:
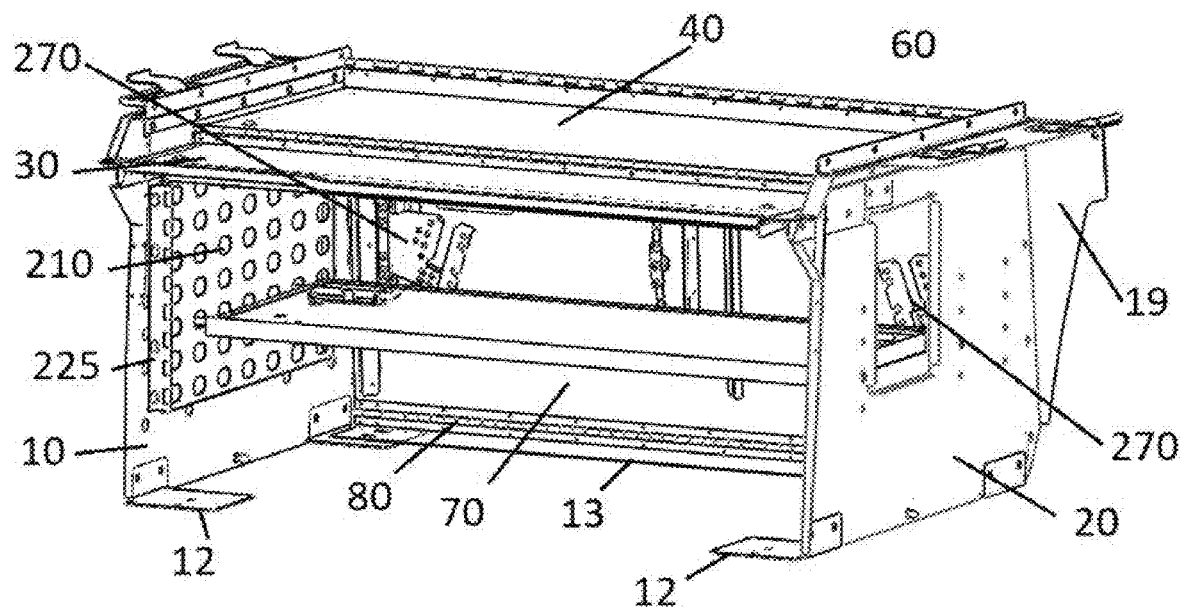
Figure 19:
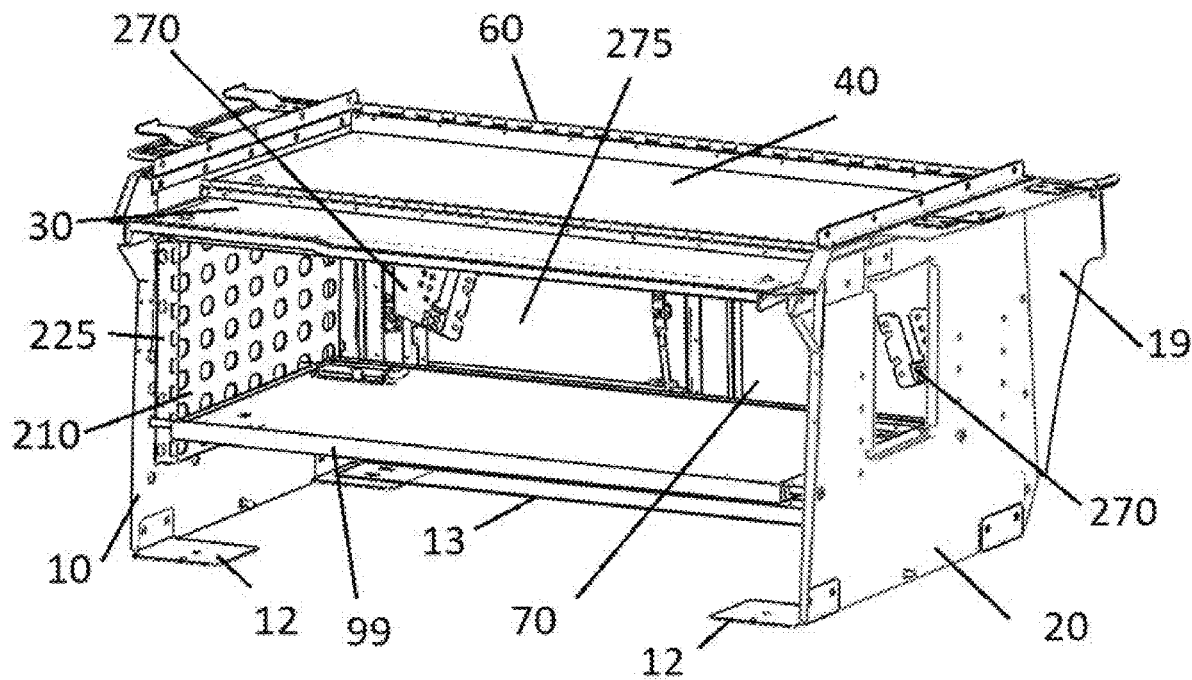
Figure 20:
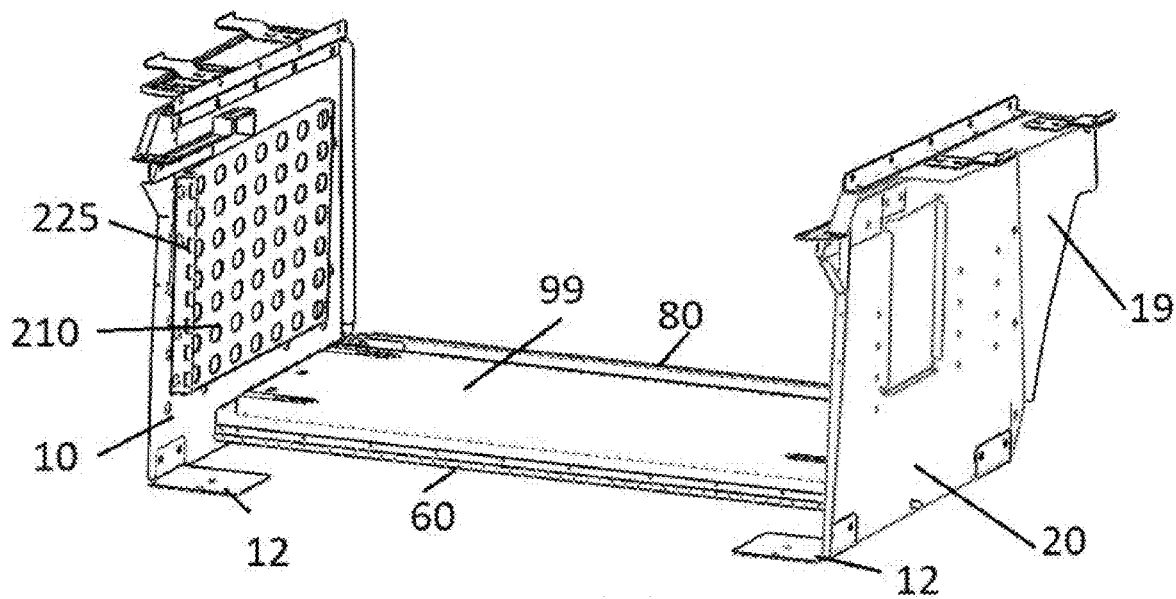
Figure 21:
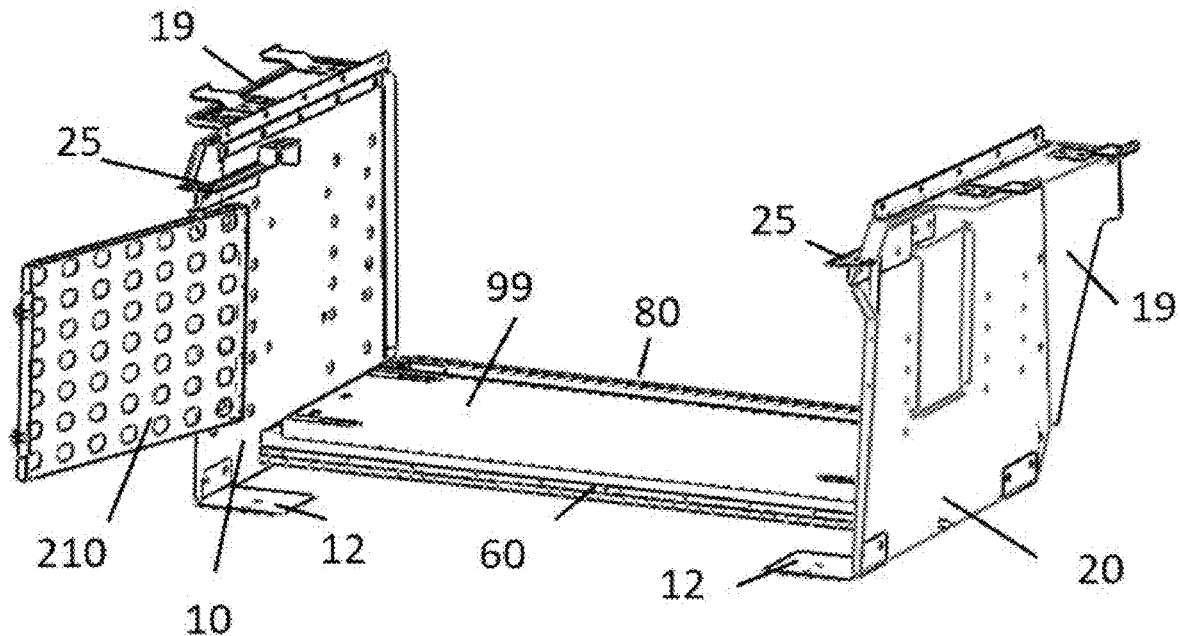
Figure 22:
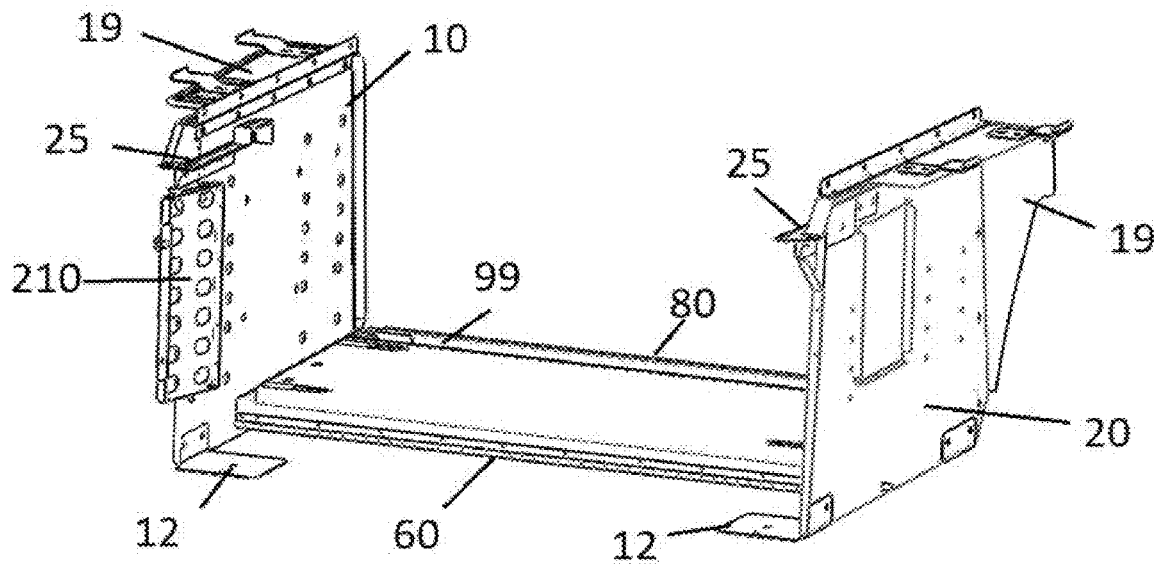
Figure 23:
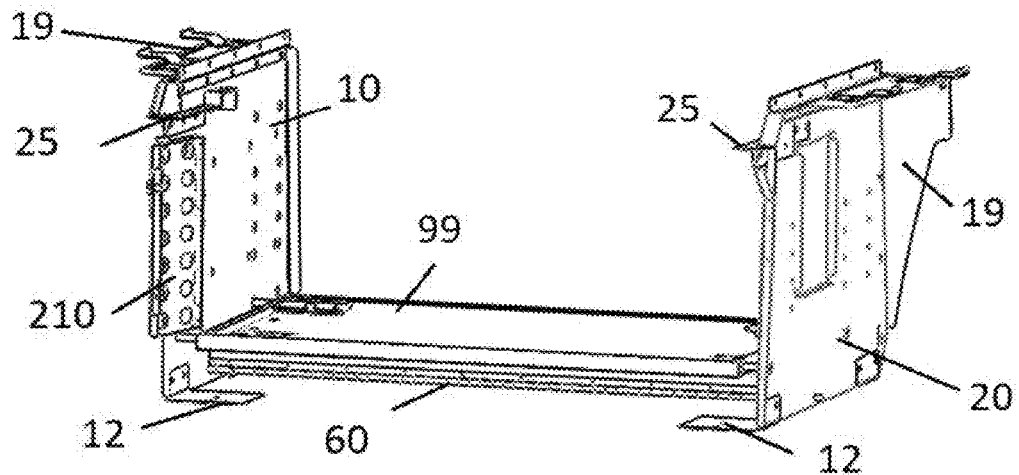
Figure 24:
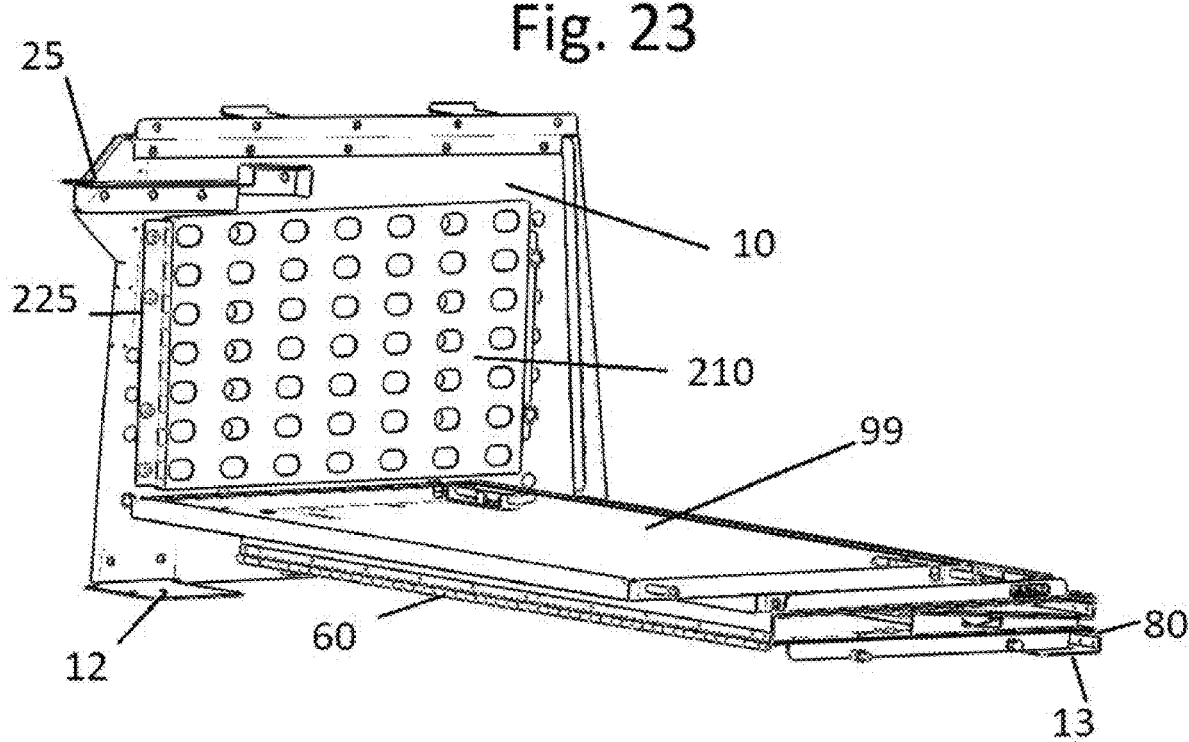
Figure 25:
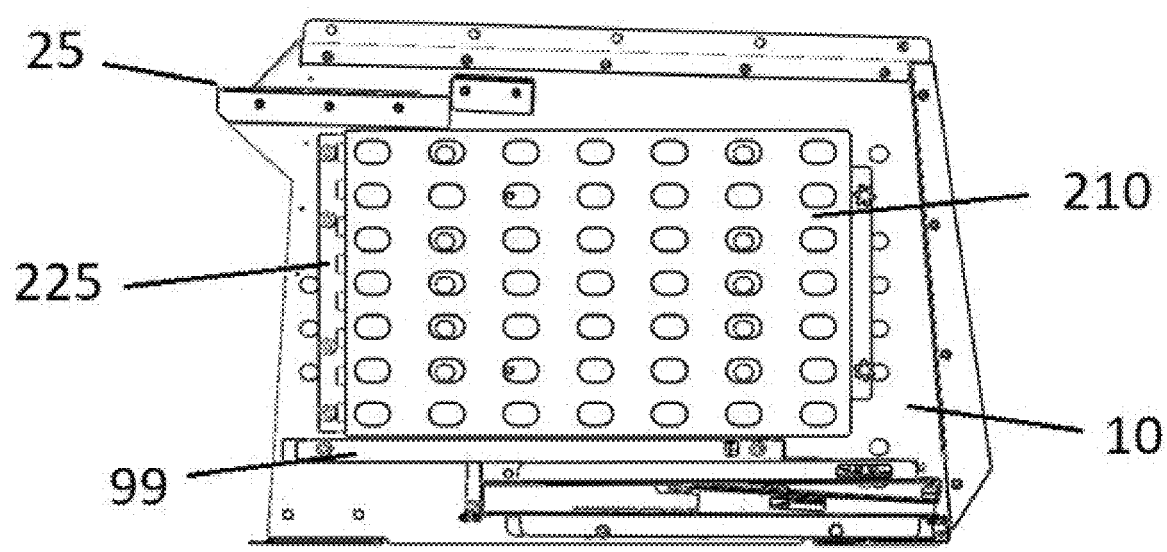
Figure 26:
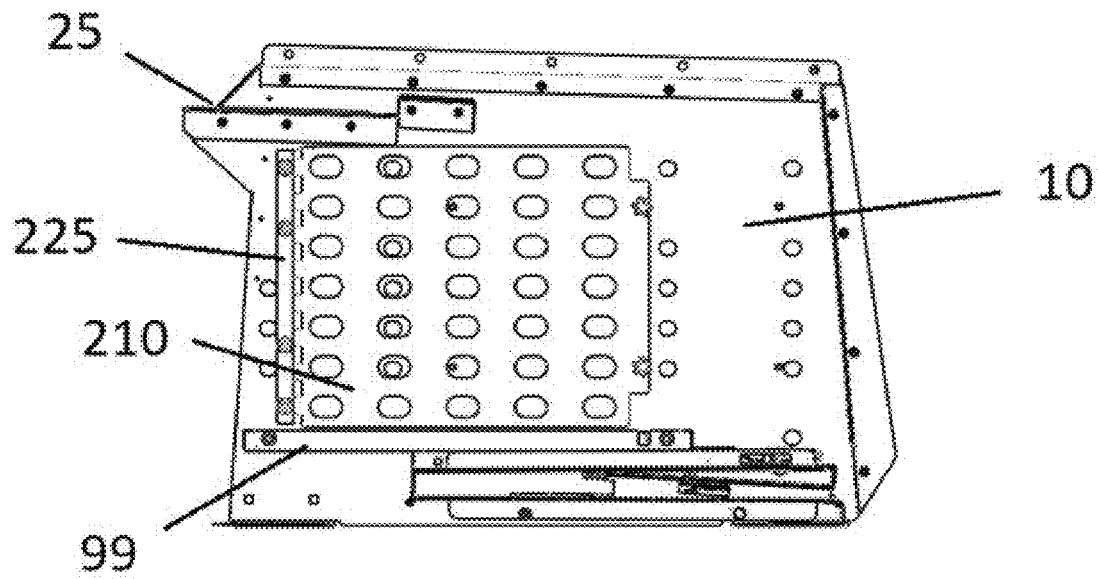
Figure 27:
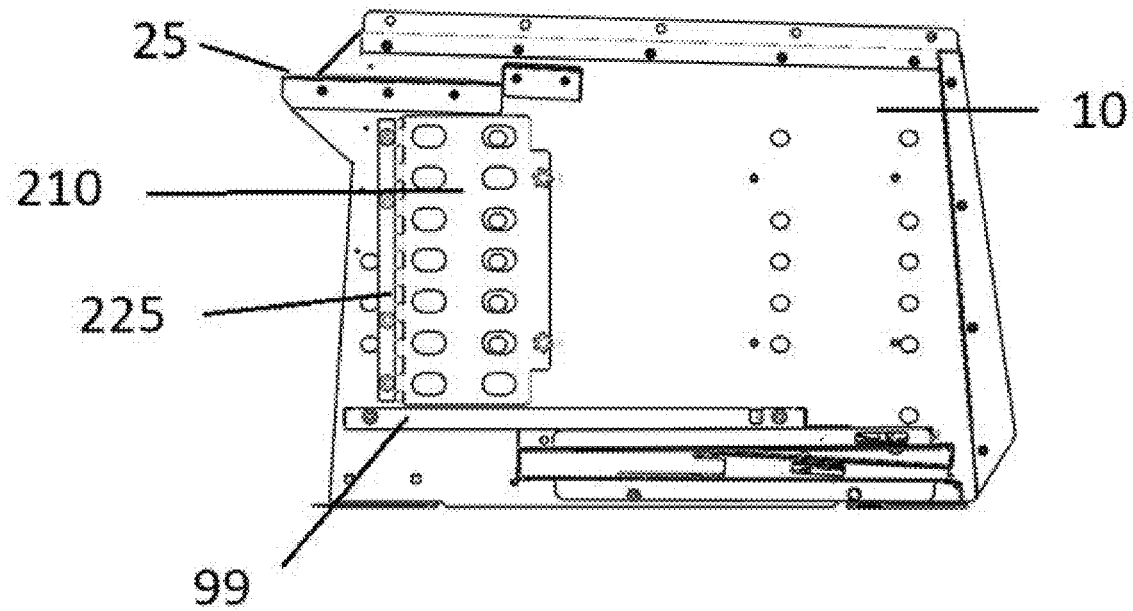
Figure 28:
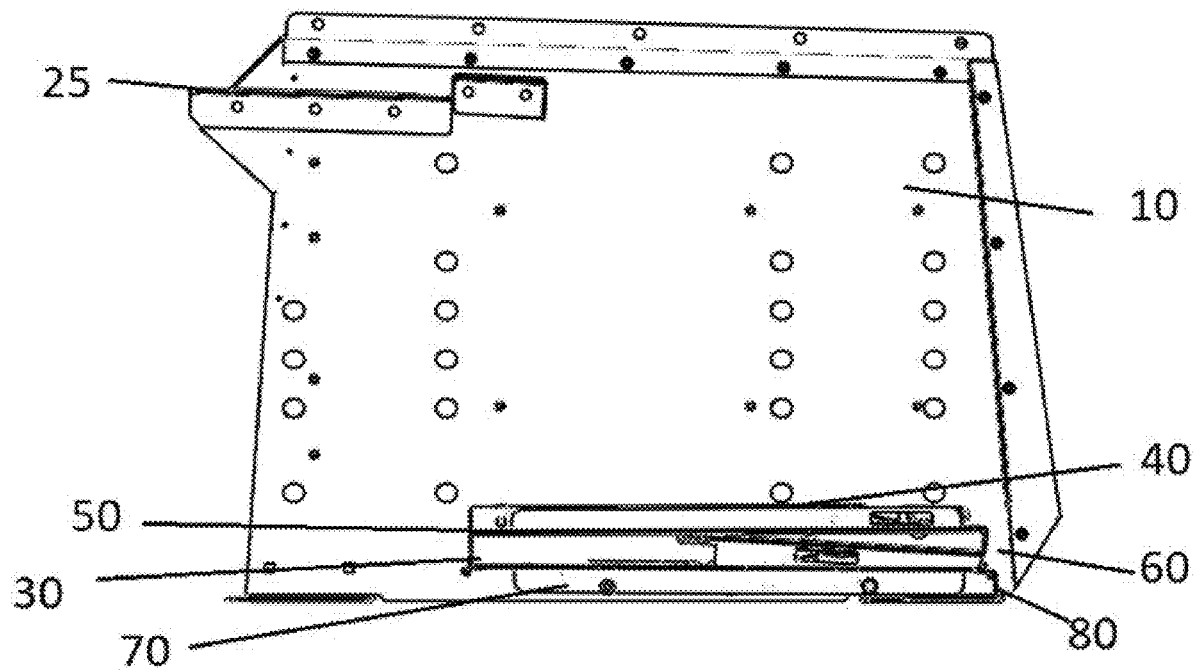
Figure 29:
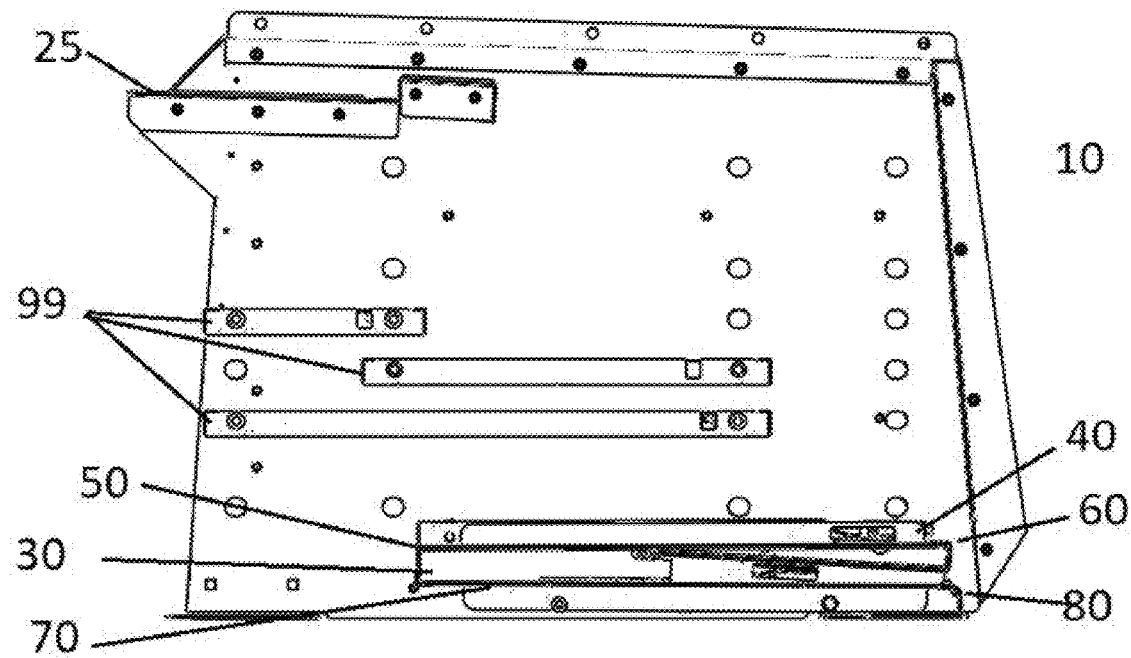
Figure 30:
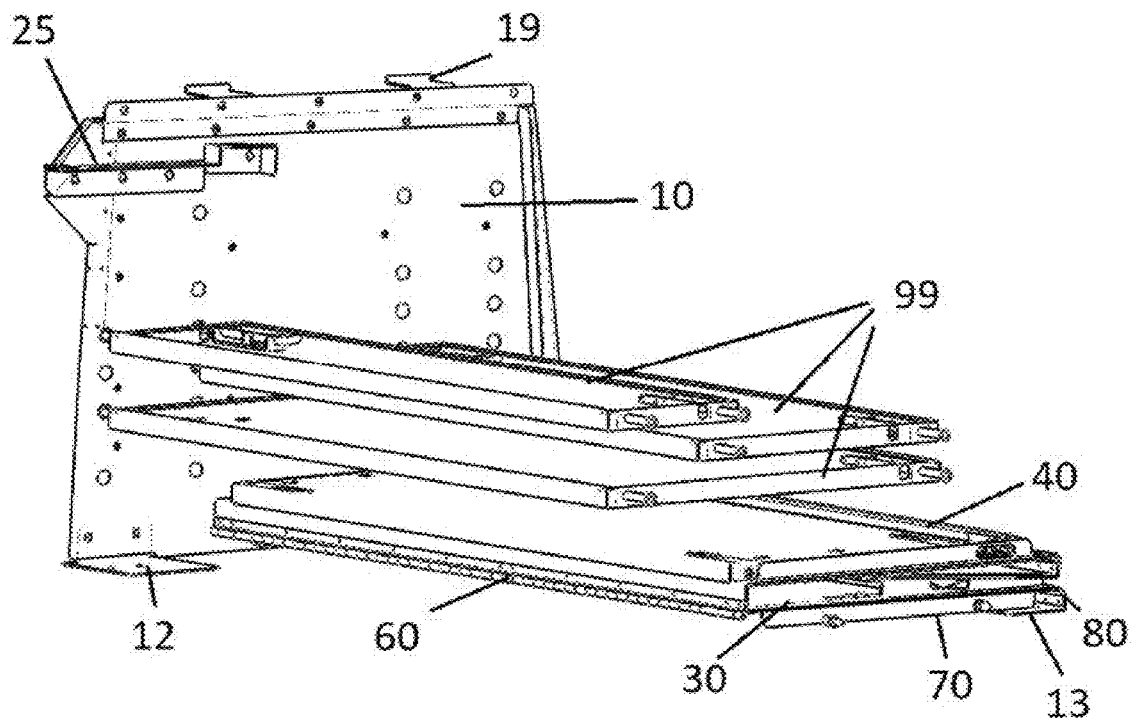
Figure 31:
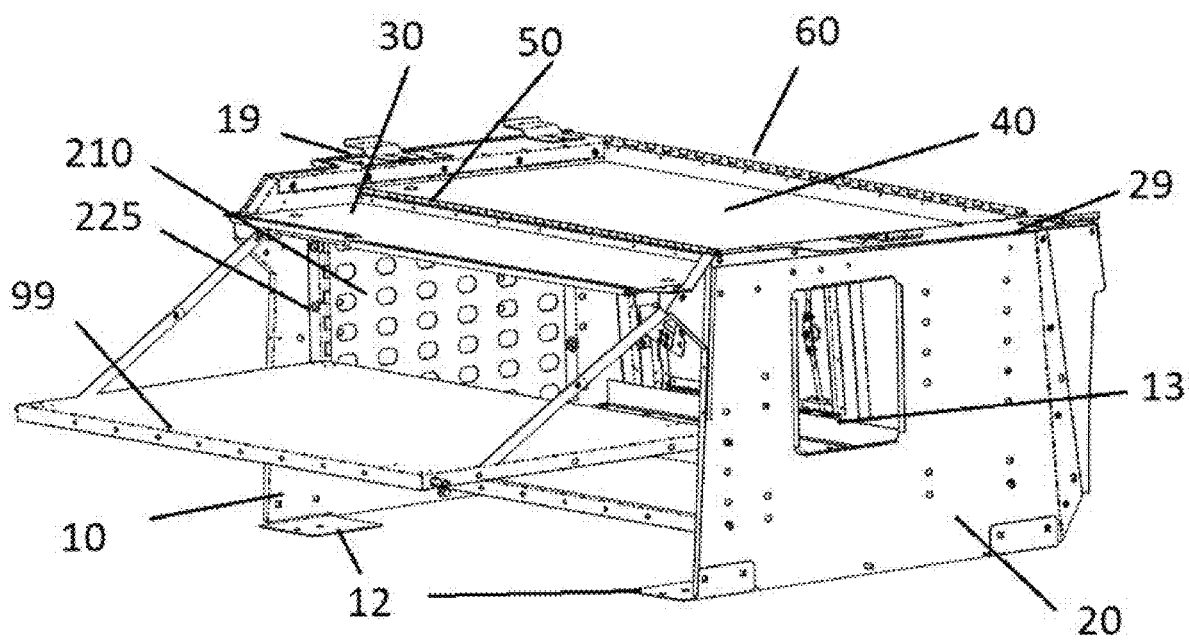
Figure 32:
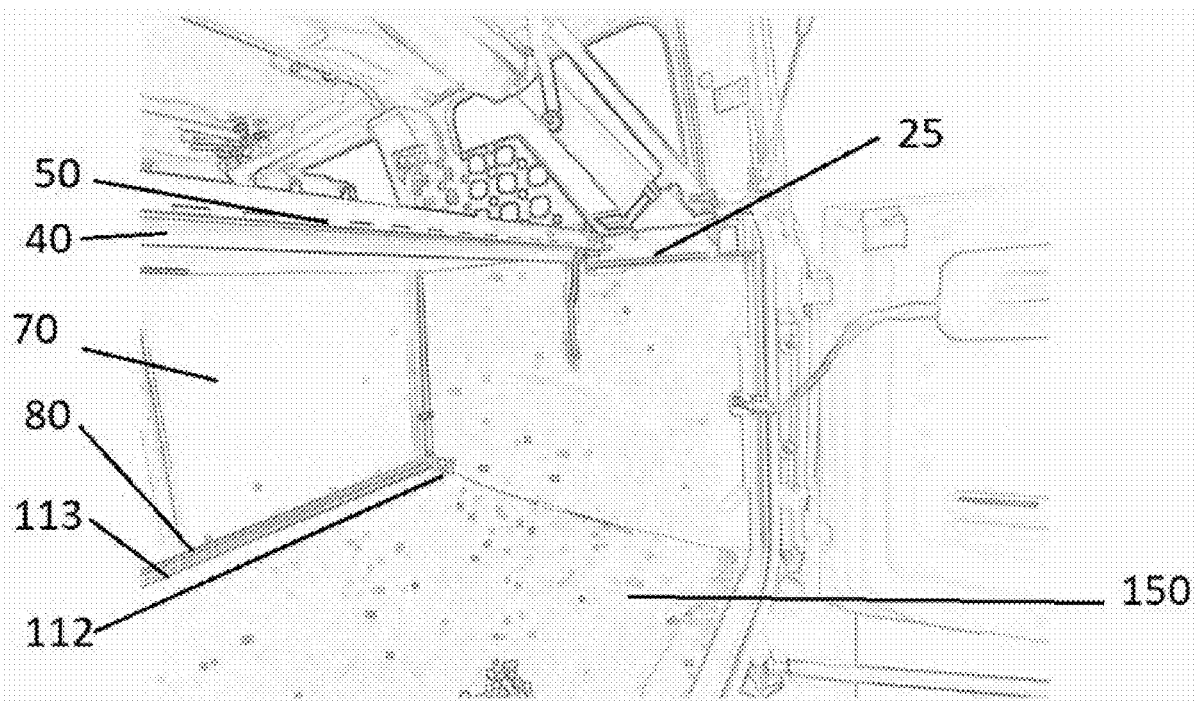
Figure 33:
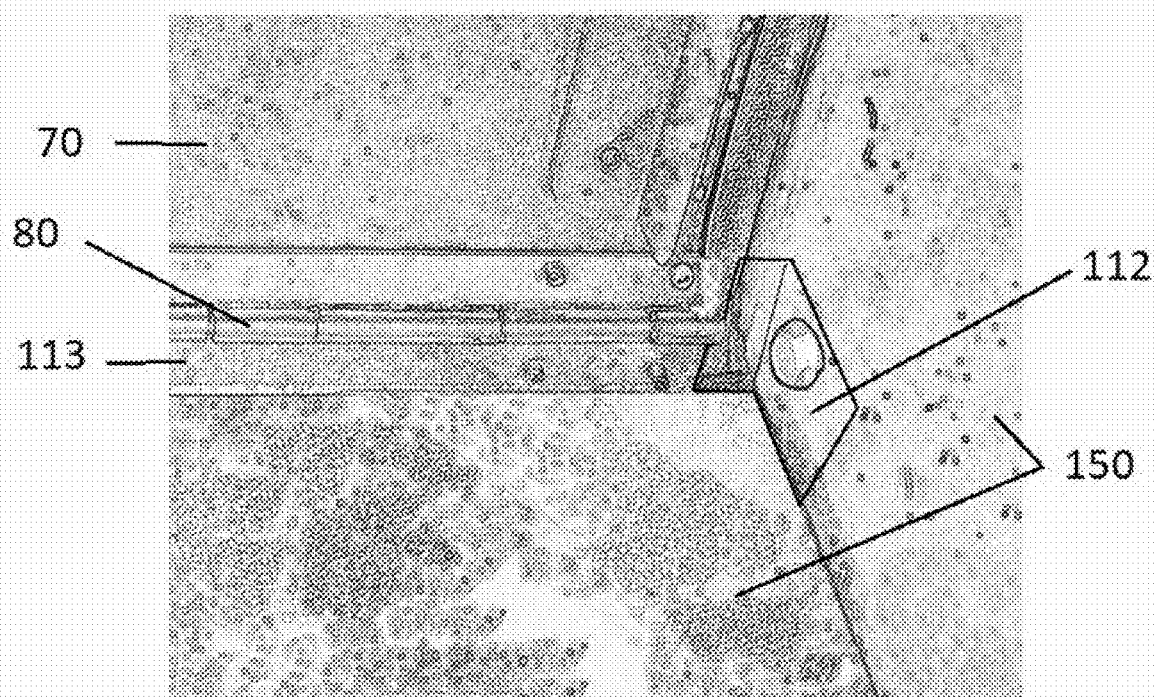
Figure 34:
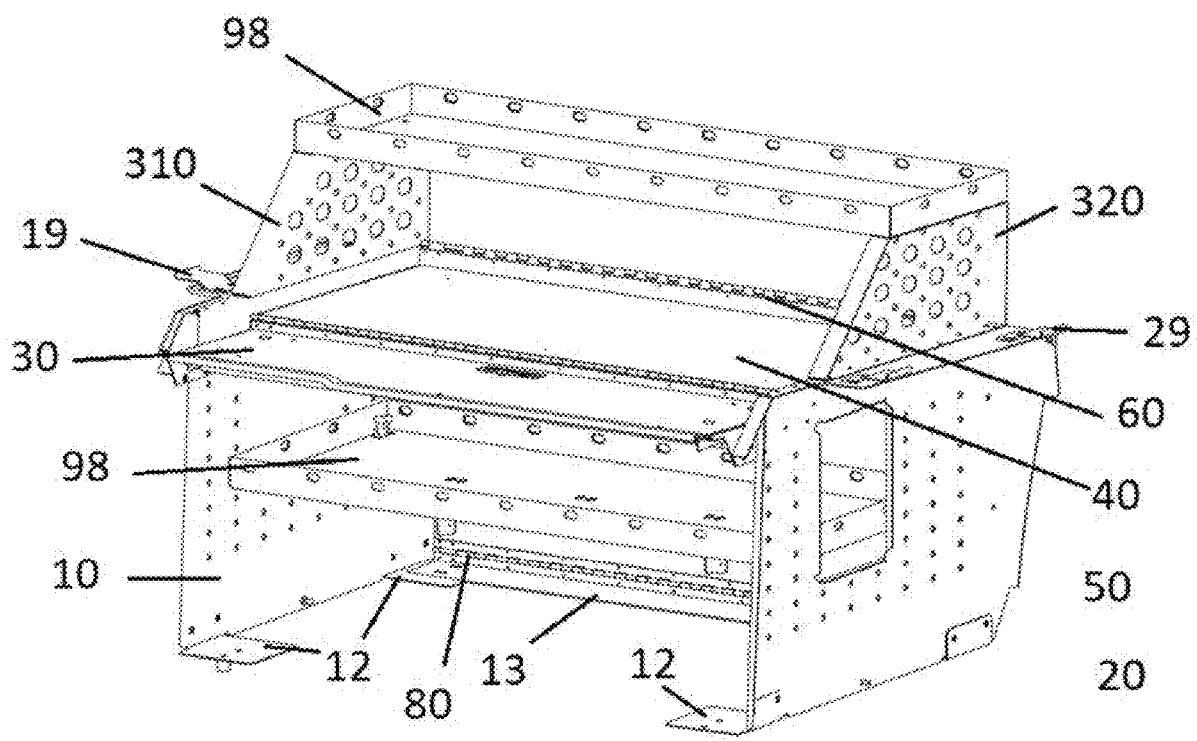
Figure 35:
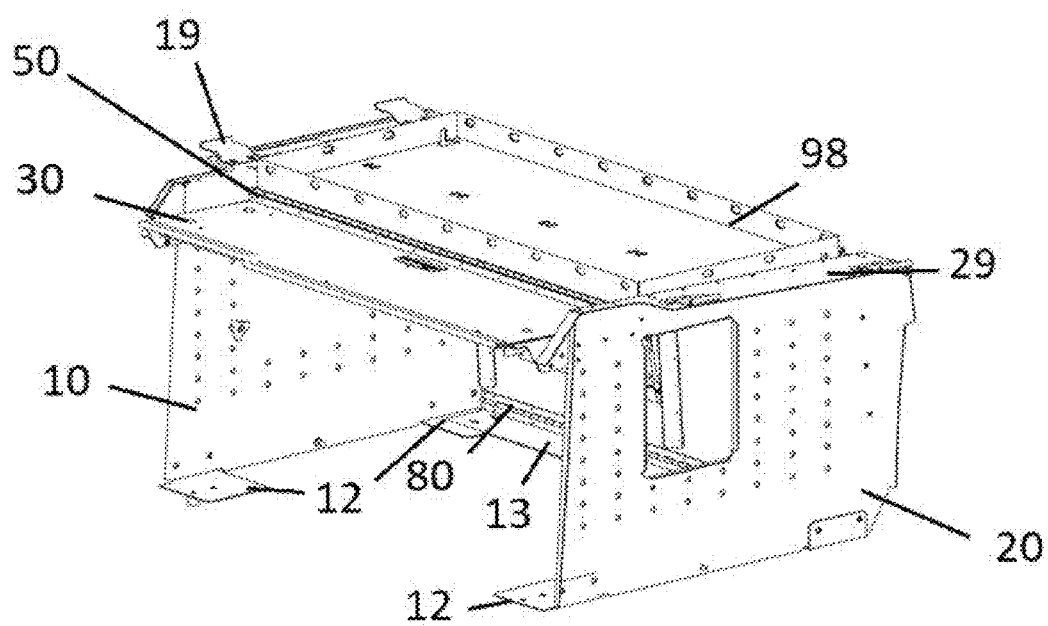
Figure 37:
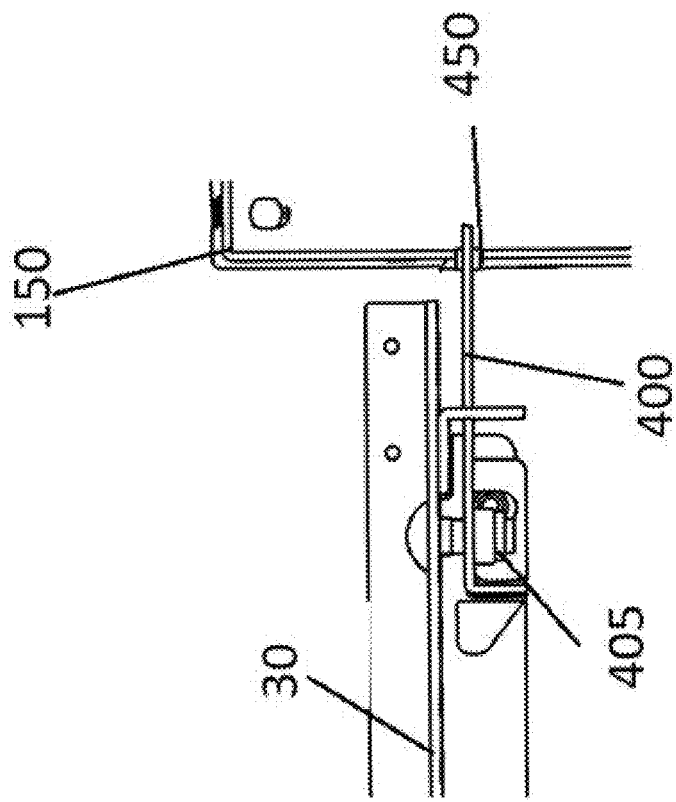
Figure 36:
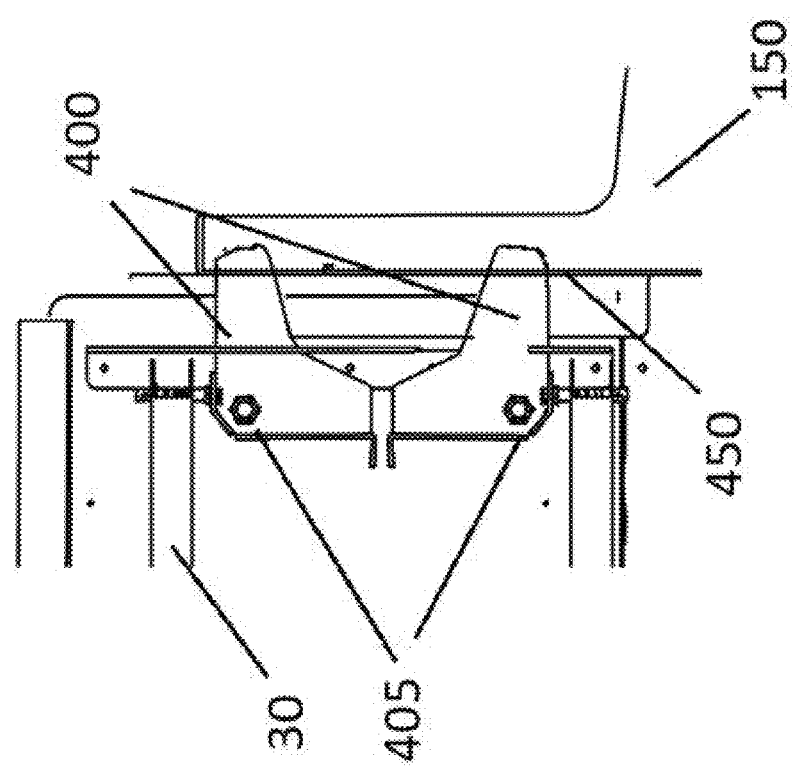
Figure 38:
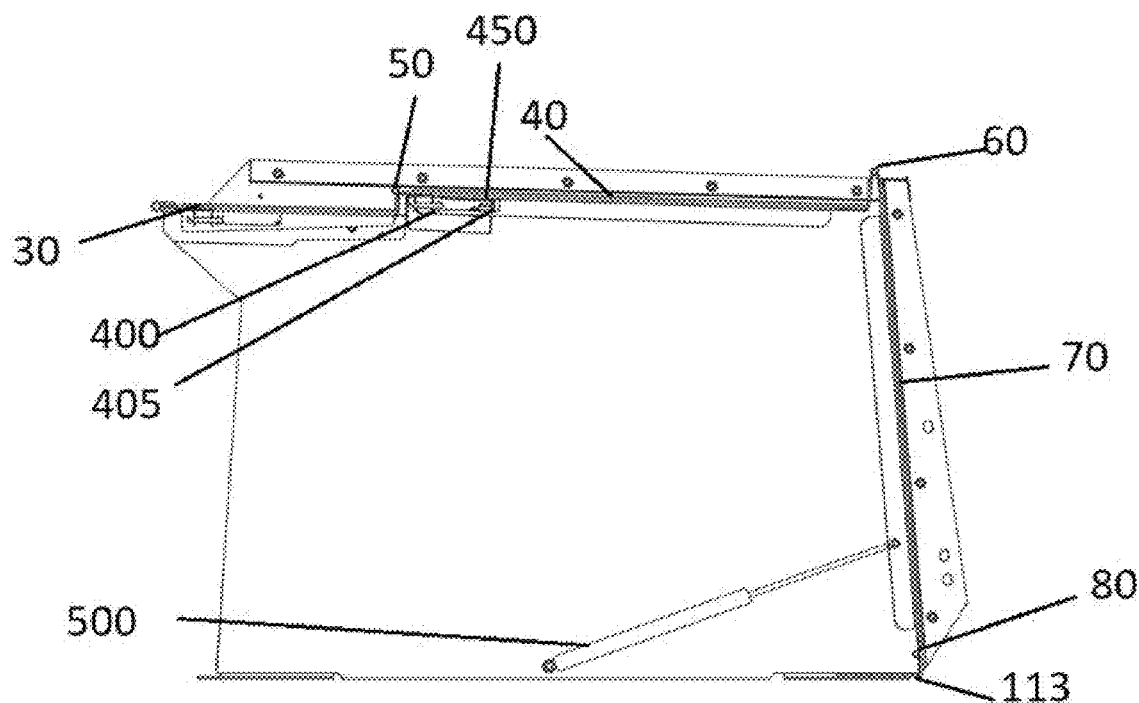
Figure 39:
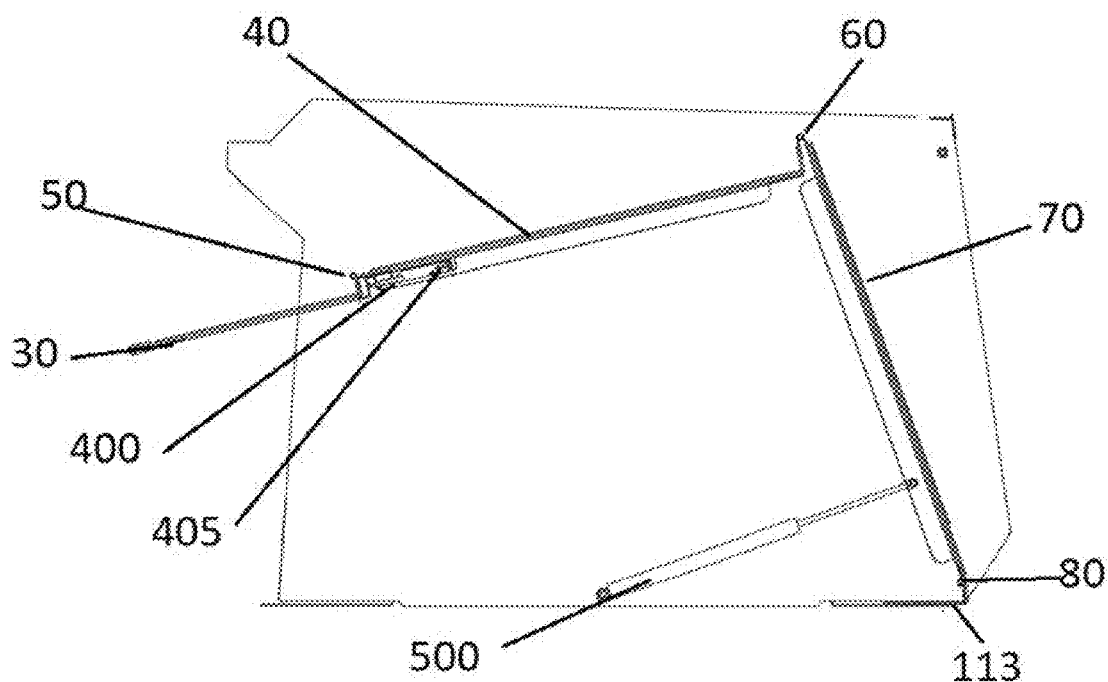
Figure 40:
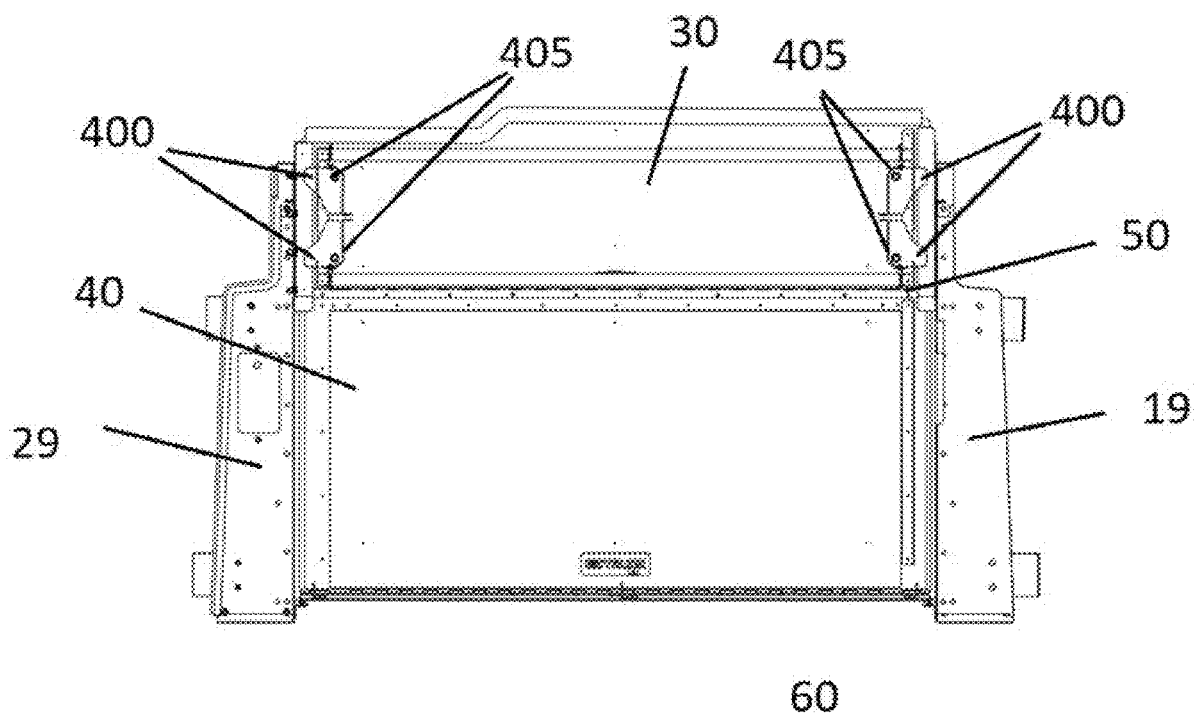
Figure 41A:
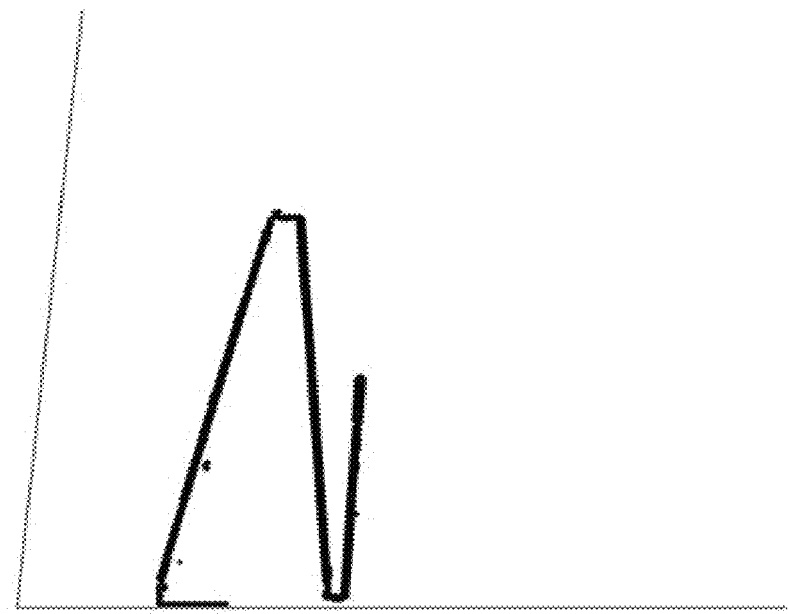
Figure 41B:
Figure 42A:
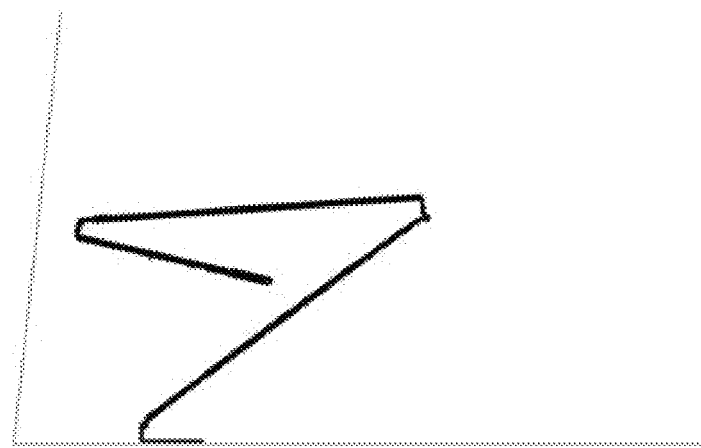
Figure 42B:
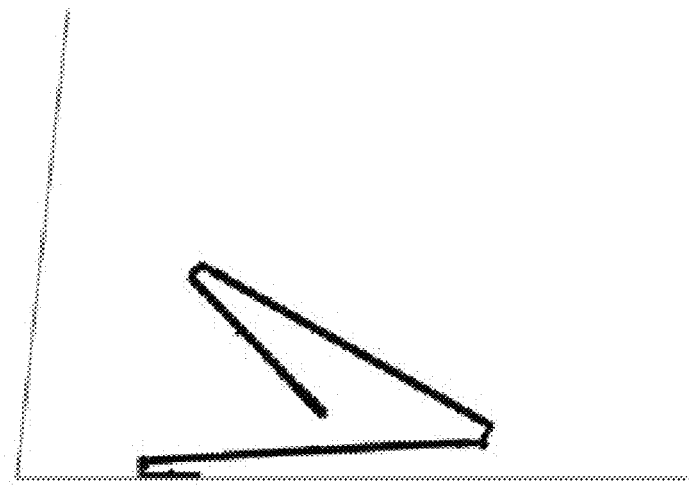
Figure 43A:
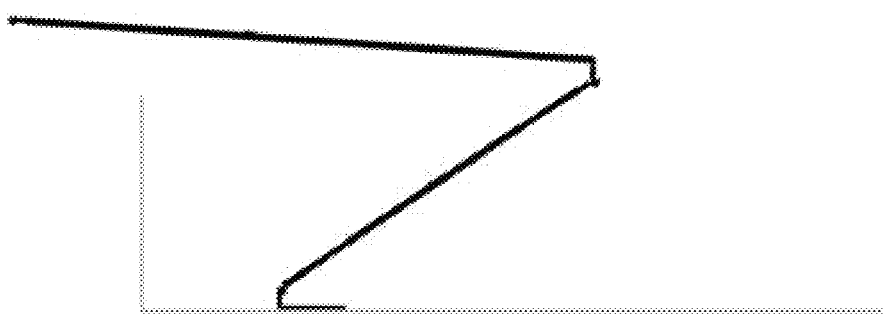
Figure 43B:

FIG. 1 is a display of a trunk that can be placed in a vehicle;
FIG. 2 shows the trunk with the first top panel opened;
FIG. 3 shows the with the first top panel folded on top of the second;
FIG. 4 shows the first and second top panel being folded down;
FIG. 5 shows all the panels being folded to bed; and
FIG. 6 shows the panels completely folded;
FIG. 7 show a view of the folded panels and the right side;
FIG. 8 shows a side view of the folded panels;
FIG. 9 shows the folded panels;
FIG. 10 is a side view of the panels;
FIG. 11 shows a side view of the panels with the first top panel being opened;
FIG. 12 shows how the panels are being folded together;
FIG. 13 shows the panels being folded;
FIG. 14 shows the sides and the Base Plate;
FIG. 15 shows the trunk with a single top panel;
FIG. 16 shows a vehicle;
FIG. 17 shows the trunk with a molle panel, gun rack and table;
FIG. 18 shows the trunk with a shelf;
FIG. 19 shows the trunk with a shelf on positioning holes;
FIG. 20 shows the trunk with the molle panel with the top and back panels folded;
FIG. 21 shows the molle panel on a hinge;
FIG. 22 shows the molle panel folded;
FIG. 23 is another view of the folded molle board;
FIG. 24 shows a side view of multiple shelves with one side removed;
FIG. 25 shows a side view from the inside of the left side with the right side being a mirror image of;
FIG. 26 shows a side view with a smaller molle panel;
FIG. 27 shows a side view from the inside with a folded molle panel;
FIG. 28 shows a side view of the side;
FIG. 29 shows a side view with shelves;
FIG. 30 shows a side view with shelves with one side showing;
FIG. 31 shows the trunk with a front table;
FIG. 32 shows trunk where the sides are the sides of the bed of the vehicle;
FIG. 33 shows the connection of the trunk to the side of the bed;
FIG. 34 shows the invention with top sides and bins; FIG.
FIG. 35 displays the trunk with a top bin;
FIG. 36 shows an alternative embodiment with a wings connecting the panels to the bed;
FIG. 37 shows the wings extending into a wing slot;
FIG. 38 shows a side view of an embodiment that attaches to the bed without sides;
FIG. 39 shows a side view of the bed embodiment being folded;
FIG. 40 shows a top view of the trunk connecting to the bed with wings;
FIGS. 41A and 41B shows one way that the panels can be folded;
FIGS. 42A and 42B display another folding pattern; and
FIGS. 43A and 43B shows a folding pattern with a single top panel.

MAIN COMPONENTS

10 Left Side
11 Securing Bolts
12 Securing tabs
13 Base Plate
19 Left side shelf
20 Right Side
21 back panel support
25 panel support bracket
27 panel latch receiver
29 Right side shelf
30 First top panel
35 Top panel latch
40 Second top panel
50 top panel hinge
60 back panel hinge
70 back panel
80 Base Plate hinge
99 shelves
100 vehicle
113 bed base plate
150 bed
210 molle board
225 molle hinge
270 gun rack
275 folding table 400 wings
405 turning bolt
450 support slot

DETAILED DESCRIPTION

The illustrations presented herein are, in some instances, not actual views of any particular framing devices or components thereof but may be idealized representations which are employed to describe the present disclosure. Additionally, elements common between figures may retain the same numerical designation.

The current invention is an improved installable vehicle trunk 1 as shown in FIGS. 1 through 30.

FIGS. 1 through 15 show an installable trunk 1 and its components that can be placed in a vehicle such as a jeep or a Bronco® as shown in FIG. 16. FIGS. 17 through 30 shows different embodiments that can be used with the adjustable trunk 1. It can be placed in the hatchback/bed 150 area of the vehicle 100. In the preferred embodiment, the trunk 1 has two sides, a left side 10 and a right side 20 and a Base Plate 13. The size and dimensions of these components depend on the size of the bed/hatchback area 150. In the preferred embodiment, the current invention has three panels, a first top panel 30, a second top panel 40 and a back panel 60. The panels (30, 40 70) are connected by hinges (50, 60, 80) to each other and to the Base Plate 13. It is designed to be free-standing. It is also designed to be clipped into the bed space 150 of the vehicle 100.

FIG. 1 shows the frame of the adjustable trunk 1 consisting of the two sides (10, 20), the Base Plate 13 with the top panels (30, 40) being closed forming the trunk 1 for the vehicle 100.

The right side 20 and the left side 10 will be mirror images of each other. At the top of the right side 20 there will be a right-side support shelf 29 that extends away from right side 20 at 90-degree angle or a similar angle. At the top of the left side 10 there will be a left side support shelf 19 that extends away from right side 20 at 90-degree angle or a similar angle. The support shelf (19, 29) helps the adjustable trunk 1 to be secured in place it the vehicle while making sure that there are no openings to the trunk space except for the opened top panels (30, 40). The support shelf (19, 29) curves approximately 90-degrees in the back which in the preferred embodiment would be flush with the back of the seats in the vehicle. The shape of the outer edge of the support shelf (19, 29) would match the space of the vehicle's bed. The support shelf (19, 29), in the preferred embodiment, will bend down slightly in the front of the support shelf.

FIG. 1 shows the first top panel 30 and the second top panel in a closed position. The first top panel 30 is connected to the second top panel 40 by a top panel hinge 50. The first top panel 30 and the second top panel 40 are flat and rectangular in shape. Their size depends on the width and length of the bed 150.

FIGS. 1 through 15 show the Base Plate 13 which runs between the two sides (10. 20) and is positioned at the back end of the sides. The Base Plate 13 is "L" shape with a bottom part and a back part which extends up from the bottom at a 90-degree angle.

FIG. 2 shows the first top panel 30 being lifted to an open position. The first top panel 50 turns on the top panel hinge 50. FIG. 3 shows the first top panel 30 folded on top of the second top panel 40 showing the top panel hinge 50. The back panel 70 is connected to the Base Plate 13 by the Base Plate hinge 80 and to the second top panel 40 by back panel hinge 60.

FIG. 4 shows the first top panel 30 folded flat onto the second top panel 40 with the two panels being folded towards the back panel 70 using the back panel hinge 60.

FIG. 5 shows the first top panel 30 folded flat onto the second top panel 40 with the two panels folded into the back panel 70. FIGS. 6 and 7 displays the panels (30, 40, 70) folded flat onto the bed 150 where the back panel 70 turns on the Base Plate hinge 80.

FIG. 8 shows a side view while FIG. 9 shows a front perspective view of the panels (30, 40, 70) folded flat onto the bed 150 of the vehicle 100 and connected to the bed by the Base Plate 13 using a connection means like a bolt 11. The Base Plate 13 is flat with the bed 150 then extends upward at a 90-degree angle where it connects to the Base Plate hinge 80. The Base Plate hinge 80 connects the Base Plate 13 to the back panel 70. The back panel hinge 80 connects the back panel 70 to the second top panel 40. In the preferred embodiment, the second top panel 40 will have a 90-degree bend after its connection to the back panel hinge 80. This will allow the first top panel 30 to be folded under the second top panel 40 as shown in FIG. 8. The second top panel 40 is connected to the first top panel 30 by the top panel hinge 60. In the preferred embodiment, the first top panel 30 will have an approximately 45-degree bend when connecting to the top panel hinge 60.

The panels (30, 40, 70) will be rectangular in shape, flat and made of a strong durable substance such as plastic or metallic.

FIG. 10 shows a crosscut view of the panels (30, 40, 70), the Base Plate 13 and the associated hinges (50, 60, 80).

FIG. 11 shows a crosscut side view of the trunk 1 with the first top panel 30 pivoting on the top panel hinge 50 opening the trunk 1 compartment. FIG. 12 shows the first top panel 30 being folded into the second top panel 30 and second top panel 40 being folded into the back panel 70. FIG. 13 shows the rear panel 70 being folded into the bed and the folded first top panel 30 being folded into the rear panel 70.

The inside of each of the sides (10, 20) have a panel support bracket 25 which extends out from the inside of each side. The panel support bracket 25 holds up the top panels (30, 40) which rests on the panel support bracket 25. The panel support bracket 25 runs from the front of the side (10,20) towards the back of the side (10,20) in a straight line parallel with the bed 150 and then curves upward at the 45-degree angle which matches the 45-degree angle of the second top panel 40 and then curves another 45-degree angle so that the panel support bracket 25 is parallel with the bed again. The panel support bracket 25 ends after the second 45-degree angle which allows the top support panels (30, 40) to be folded without hitting the panel support bracket 25 as shown in FIG. 4.

A plurality of top panel latches 35 will be on the bottom of the first top panel 30 which a corresponding plurality of panel latch receivers 27 which are positioned to secure the first top panel 30 to the panel support bracket 25.

The sides (10, 20) will have a back panel support 21 that extends perpendicular out from the back of the sides (10, 20) towards the middle of the trunk 1. The back panel support 21 provides support to the back panel 70 when the back panel 70 is in its non-folded up right position. The back panel 70 is held in position by the two back panel supports 21 with the back of the back panel 70 touching the back panel support 21.

The adjustable trunk 1 will be secured to the bed 150 of the vehicle through the use of a securing means such as bolts 11. In the preferred embodiment, the sides will have securing tabs 12 the attach to the sides with bolts 14 or welds extend out from the bottom of the sides at a 90-degree angle. The extended part of the securing tabs 12 will be connected to the bed of the vehicle using the securing bolts 11. The Base Plate 13 will have a plurality of securing bolts 11 that run through the Base Plate 13 securing it to the bed. The Base Plate 13 will have holes positioned for were the bolts 11 are to go.

The adjustable trunk 1 can have a single top panel 30 as shown in FIG. 15. This embodiment works with vehicles with smaller beds 150. The adjustable trunk 1 can also have more than two panels for larger vehicles 100. In this configuration, the panel support bracket 25 would extend further into the bed 140.

FIG. 17 shows the trunk with additional elements such as a molle panel 210, gun rack 270 and folding table 275 opening in the back panel 70. The molle panel 210 will be connected to the side 10 using a molle hinge 225 which will allow the molle panel 210 to fold out. The molle panel 210 will be removable in the preferred embodiment. The molle panels 210 are connected to each side (10, 20) and allow for the hanging or connecting of things to the sides of the adjustable trunk 1 such as a plurality of shelves 99 as shown in FIG. 18. The sides (10, 20) could also have positioning holes which the shelves 99 can be attached to as shown in FIG. 19. FIG. 24 shows a side view of multiple shelves 99.

FIG. 20 shows the adjustable trunk 1 with the molle panel 210 with the top and back panels folded with a shelf 99 in place on top of the folded panels. FIG. 21 shows the molle panel 210 on a molle hinge 225. The molle panel 210 can be folded in one embodiment as such in FIGS. 22 and 23.

FIG. 25 shows the side view as viewed from the inside of the left side with the right side being a mirror image of showing the embodiment with the hinged molle board 210. FIG. 26 shows a smaller molle panel while FIG. 27 shows a side view from the inside with a folded molle panel.

FIG. 28 shows a side view of the side 10. FIG. 29 shows a side view of the adjustable trunk 1 with shelves 99 while FIG. 30 shows a different side view with shelves 99.

FIG. 31 shows the trunk with a front table that is a shelf 99 that extends and folds out from the front on the trunk 1 with folding support brackets that can secure it to the sides (10, 20).

The folding trunk 1 can be attached directly to the bed 140 without the sides (10, 20). FIG. 32 shows folding trunk 1 where the sides are the sides of the bed 150 of the vehicle 100 with a bed base plate 113 attached to the bottom of the bed 150 and to the sides of the bed 150 with bed attachment tabs 112. Figure shows the connection of the folding trunk 1 to the side of the bed 150. In this configuration, the panel support brackets 125 attached to the sides of the bed 150.

In an alternative embodiment, FIG. 34 shows the invention with top sides (310 and 320) that extend up from the sides (10, 20). FIG. 34 shows the folding trunk 1 with a bin 98 on the top of top sides (310, 320) as well as a bin 98 hanging from the sides within the folding trunk 1. FIG. 35 displays the folding trunk 1 with a top bin 98.

FIG. 36 shows another alternative embodiment where the folding trunk 1 does not have any sides but is fixed to the sides of the bed 150. This embodiment has wings 400 that are connected to the bottom of a panel by a turning bolt 405. The wings 400 can be turned out from the bottom of the panel so that they extend out from the panel. When the wings 400 extend out they can fit into support slots 450 located on the sides of the bed 150 as shown in FIG. 37. The support slots 450 are slots with a width that are slightly wider than the thickness of the wings 400. The wings 400 fitting into the support slots 450 supporting the panel. FIG. 38 shows a side view of this embodiment and FIG. 39 shows a side view of this embodiment being folded. FIG. 40 shows a top view of the trunk connecting to the bed with wings 400 extended into the support slots 450 holding and supporting the first top panel 30.

The panels can be folded flat with many different folding patterns. FIGS. 41A and 41B shows the preferred method for the panels can be folded. FIGS. 42A and 42B display another folding pattern. FIGS. 43A and 43B shows a folding pattern with a single top panel.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art.

What is claimed is:

1. A device comprising:
a folding trunk having a base plate that runs between a left side and a right side and connected to a back panel by a base plate hinge where the back panel is connected to a plurality of top panels by a back panel hinge where the top panels are connected by a top panel hinge where the back panel and the top panels can be folded into a flat position and folded into a trunk position where the back panel extends up from base plate and where the top panels extend away from the back panel to form the trunk, where inside of each of the left side and the right side is a panel support bracket which extends out from the inside of left side and the right side where the panel support bracket holds up the top panels and where one of the top panels can be pivoted up.

2. The device according to claim 1 further comprising:
having a plurality of securing tabs connected to the left sides and right sides and having a back panel support that extends perpendicular out from the back of the left side and the right side.

3. The device according to claim 1 further comprising:
having a plurality of molle panels connected to a side by a molle hinge.

4. The device according to claim 1 further comprising:
having one or more of a group of shelves or bins.

5. The device according to claim 1 further comprising:
having a folding table.

6. The device according to claim 1 further comprising:
having a gun rack.

7. The device according to claim 1 further comprising:
where an extended part of the securing tabs will be connected to the bed of the vehicle using the securing bolts.

8. The device according to claim 1 further comprising:
having a plurality of turnable wings connected to one or more of the panels.

9. The device according to claim 8 further comprising:
where the turnable wings are connected to the panel by a turning bolt.

10. The device according to claim 8 further comprising:
the bed having a plurality of support slots which the turnable wings fit into.

11. A device comprising:
a folding trunk having a base plate that runs between a left side and a right side and connected to a back panel by a base plate hinge where the back panel is connect to a top panel by a top panel hinge where the back panel and the top panel can be folded into a flat position and folded into a trunk position where the back panel extends up from base plate and where the top panel extends away from the back panel to form the trunk, where inside of each of the left side and the right side is a panel support bracket which extends out from the inside of left side and the right side where the panel support bracket holds up the top panel and where the top panel can be pivoted up.

\* \* \* \* \*